United States Patent [19]
Mimura

[11] Patent Number: 5,937,701
[45] Date of Patent: Aug. 17, 1999

[54] VARIABLE SPEED CHANGE GEAR

[76] Inventor: Kenji Mimura, 29-1105 Wakabadai 4-chome, Asahiku, Yokohama, Japan

[21] Appl. No.: 08/930,692
[22] PCT Filed: Feb. 6, 1996
[86] PCT No.: PCT/JP96/00237
  § 371 Date: Oct. 6, 1997
  § 102(e) Date: Oct. 6, 1997
[87] PCT Pub. No.: WO97/29301
  PCT Pub. Date: Aug. 14, 1997
[51] Int. Cl.$^6$ .................................................. F16H 29/04
[52] U.S. Cl. ............................................. 74/117; 475/329
[58] Field of Search ............................... 74/117; 475/329

[56] References Cited

U.S. PATENT DOCUMENTS

| | | | |
|---|---|---|---|
| 3,359,813 | 12/1967 | Okano | 74/117 |
| 3,803,931 | 4/1974 | Bianchini et al. | 74/117 |
| 3,848,474 | 11/1974 | Epstein | 74/117 |
| 3,892,139 | 7/1975 | Harris | 74/117 |
| 4,114,466 | 9/1978 | Meucci | 74/117 |

FOREIGN PATENT DOCUMENTS

| | | | |
|---|---|---|---|
| 56-52657 | 5/1981 | Japan | 74/117 |
| 2-2559 | 1/1990 | Japan . | |
| 3-46048 | 4/1991 | Japan . | |
| 5-46459 | 7/1993 | Japan . | |

*Primary Examiner*—Alan D. Herrmann
*Attorney, Agent, or Firm*—Lowe Hauptman Gopstein Gilman & Berner

[57] ABSTRACT

When an input shaft 6 is rotated by an external driving force, the resultant rotational force of the input shaft 6 is transmitted to an offset housing 21 of which rotational force in turn is transmitted to variable rings 39. If, at that time, angular volocities of the variable rings 39 are periodically varied relative to the angular velocity of the offset housing 21, the periodically varying angular velocities of the variable rings 39 are corrected to be substantially constant in a predetermined phase range, allowing only rotational forces having corrected angular velocities to be fetched from the variable rings 39 for transmission to an output shaft 7. Thus, by arbitrarily varying the angular velocities of the variable rings 39 relative to the angular velocity of the offset housing 21, the rotational speed of the output shaft 7 is steplessly varied relative to the rotational speed of the input shaft 7.

10 Claims, 23 Drawing Sheets

VARIABLE SPEED CHANGE GEAR

TECHNICAL FIELD

The present invention relates generally to a variety of mechanical apparatuses for transmission of power, and more particularly to a variable speed change gear for use in automatic variable speed vehicles.

BACKGROUND ART

In comparison with electric motors, internal combustion engines used in automobiles or the like have a feature that the torque increases according as the speed of rotation goes up, with a small torque at a low speed of rotation. In automatic variable speed vehicles mounted with such internal combustion engines, use is made of, e.g., a torque converter for increasing the torque to make up for a lack of torque at a low speed rotation. Due to the torque converter which effects transmission of power with a slip, however, the automatic variable speed vehicles are inferior in accelerating ability and fuel efficiency to manual variable speed vehicles incorporating a pressure connection type clutch, with a slight shock at a gear change remaining unsolved. Recent development is therefore directed toward variable speed change gears capable of freely varying the change gear ratios and ensuring traveling within a range in which is generated maximum output or maximum torque of the engine. This will achieve improvement in accelerating ability and fuel efficiency, as well as elimination of shocks at a gear change, which are problems involved in the automatic variable speed vehicles. Currently known as the most typical variable speed change gear is one employing a metallic belt and a pair of pulleys, in which type the groove widths of the pulleys are continuously varied so as to vary the radii of the belt passing around the pulleys to thereby perform speed variation.

In the variable speed change gear serving to transmit the power with the aid of frictional force generated between the belt and the pair of pulleys as described above, inconveniently, a larger-sized apparatus is required for transmitting a higher level of power due to a reduction in efficiency of power transmission. This resulted in inability of application to widespread fields, including limitation to the small-sized vehicles if mounted on the motor vehicles.

The present invention was conceived in view of the above problems. It is therefore the object thereof to provide a variable speed change gear ensuring an effective transmission of power.

DISCLOSURE OF THE INVENTION

In order to achieve the above object, the present invention provides a variable speed change gear comprising an input side rotator rotationally driven by an external driving force; an output side rotator arranged concentrically with the input side rotator; a main driving rotator turning on the axis of rotation of the input side rotator under the action of a rotational force of the input side rotator; a plurality of driven rotators arranged on a predetermined circumference around the axis of rotation of the input side rotator, the driven rotators revolving along the circumference under the action of a rotational force of the main driving rotator; angular velocity varying means for periodically varying angular velocities of the driven rotators relative to the angular velocity of the main driving rotator; angular velocity correcting means for correcting periodically varying angular velocities of the driven rotators to be substantially constant within a predetermined phase range; and rotational force extracting means for extracting from the driven rotators only rotational forces having corrected angular velocities for transmission to the output side rotator. Thus, when the input side rotator is rotated by an external driving force, the resultant rotational force of the input side rotator is transmitted to the main driving rotator of which rotational force in turn is transmitted to the driven rotators. If, at that time, angular velocities of the driven rotators are periodically varied relative to the angular velocity of the main driving rotator, the periodically varying angular velocities of the driven rotators are corrected to be substantially constant in a predetermined phase range, allowing only rotational forces having corrected angular velocities to be fetched from the driven rotators for transmission to the output side rotator. Accordingly, by varying the angular velocities of the driven rotators relative to the angular velocity of the main driving rotator, the output side rotational speed is steplessly varied relative to the input side rotational speed.

BEST MODE FOR CARRYING OUT THE INVENTION

Figure 1:
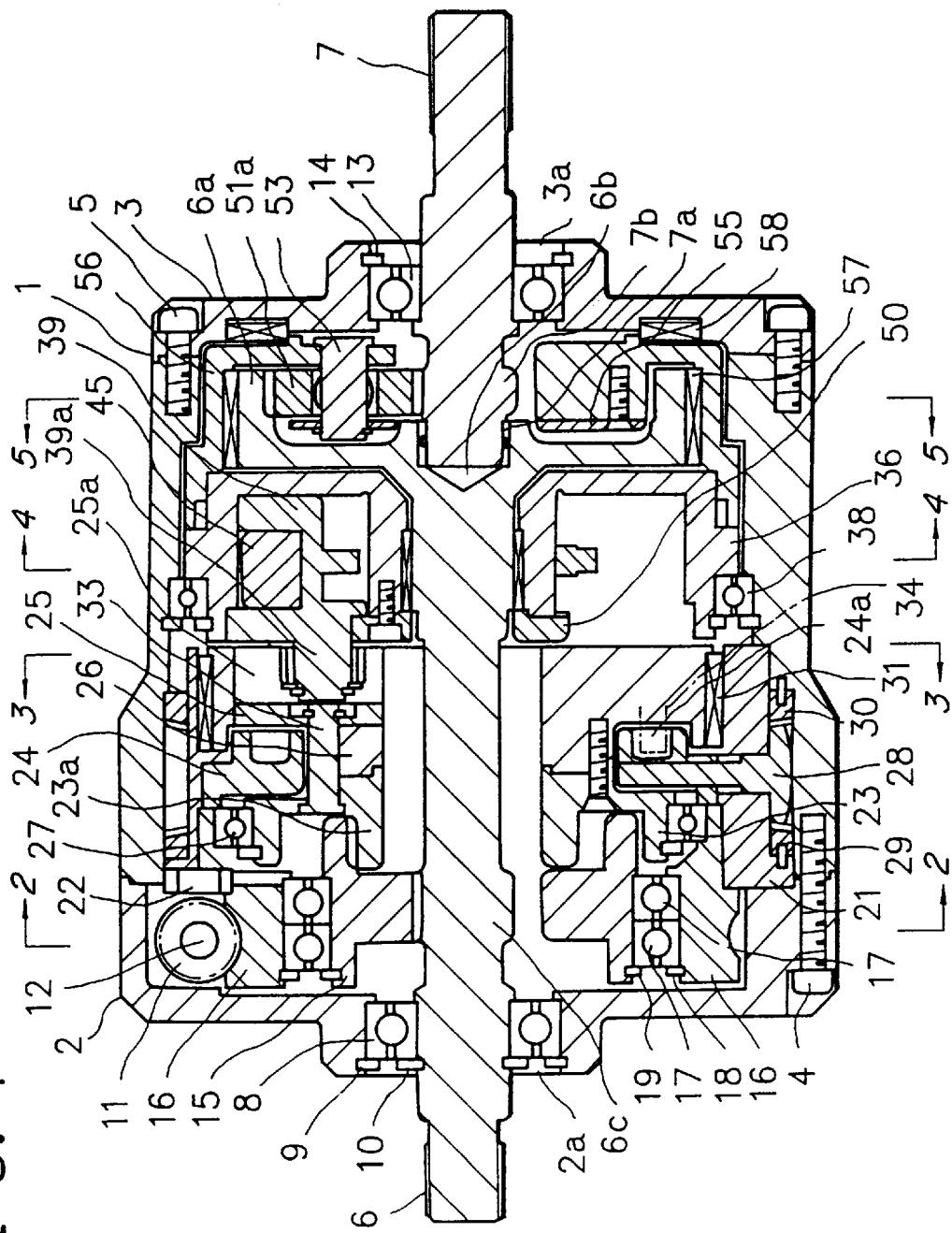
FIG. 1 is a cross-sectional side view of a variable speed change gear showing a first embodiment of the present invention.
Figure 2:
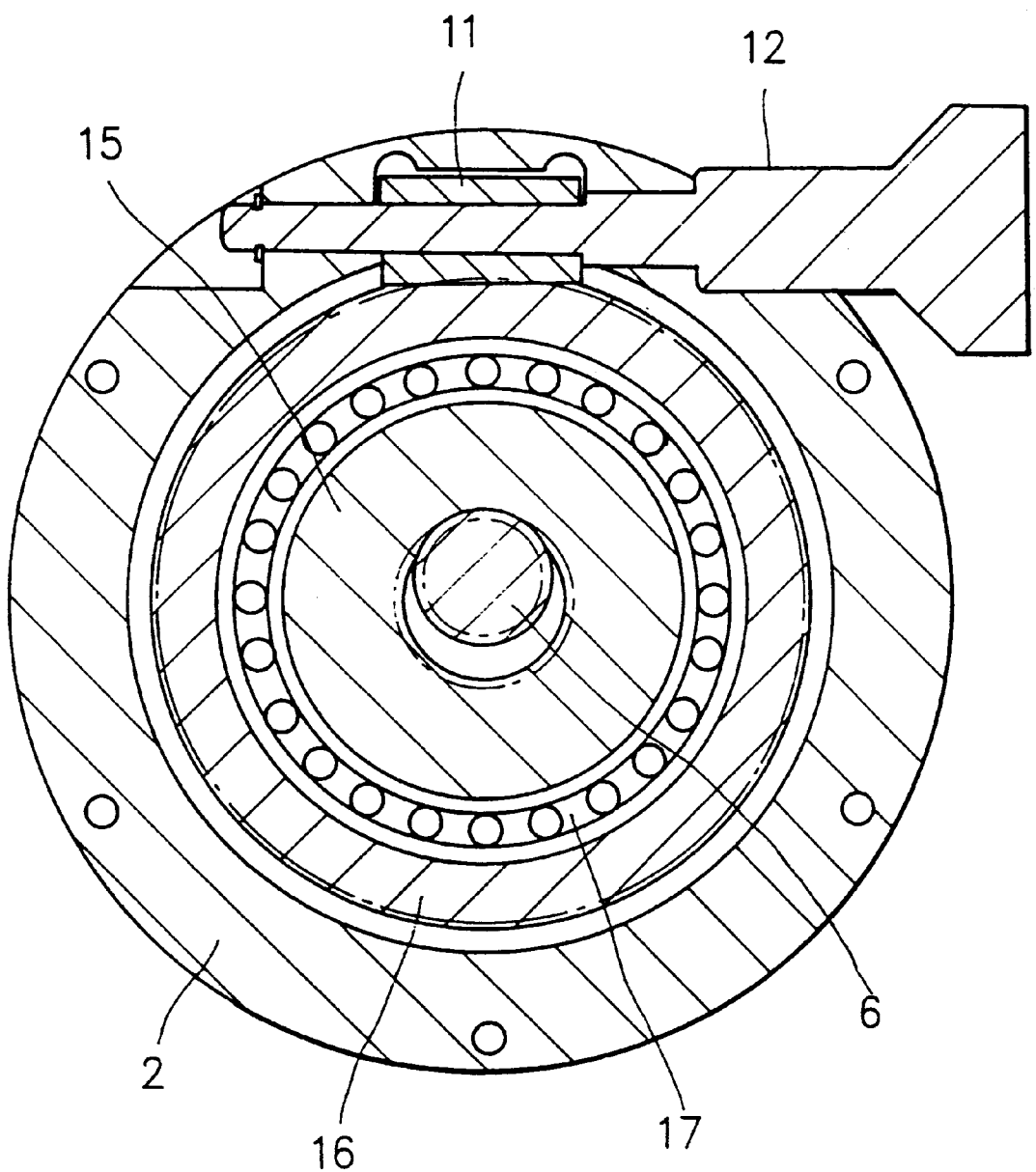
FIG. 2 is a cross-sectional view taken along a line 2—2 of FIG. 1 and viewed from the direction of arrow.
Figure 3:
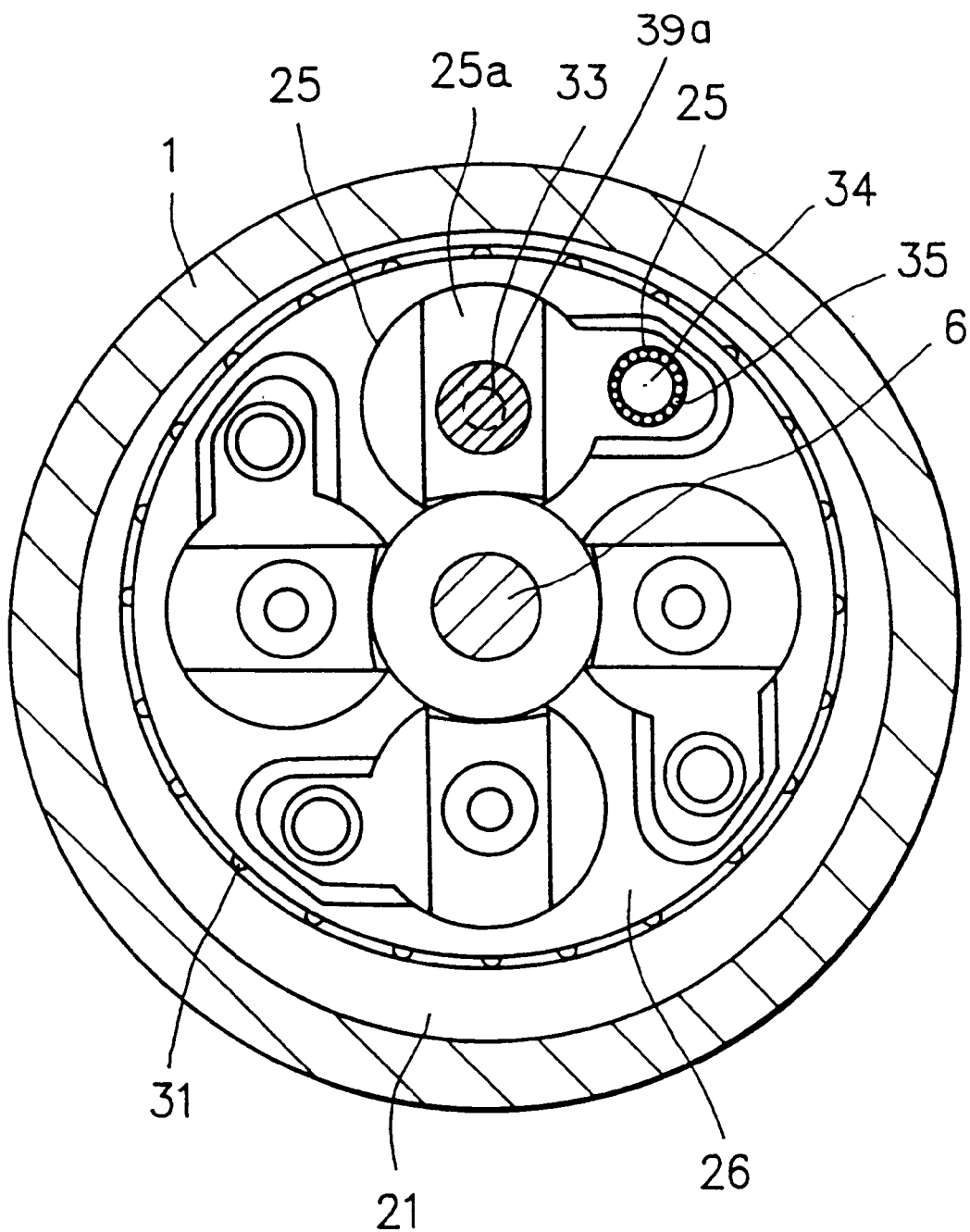
FIG. 3 is a cross-sectional view taken along a line 3—3 of FIG. 1 and viewed from the direction of arrow.
Figure 4:
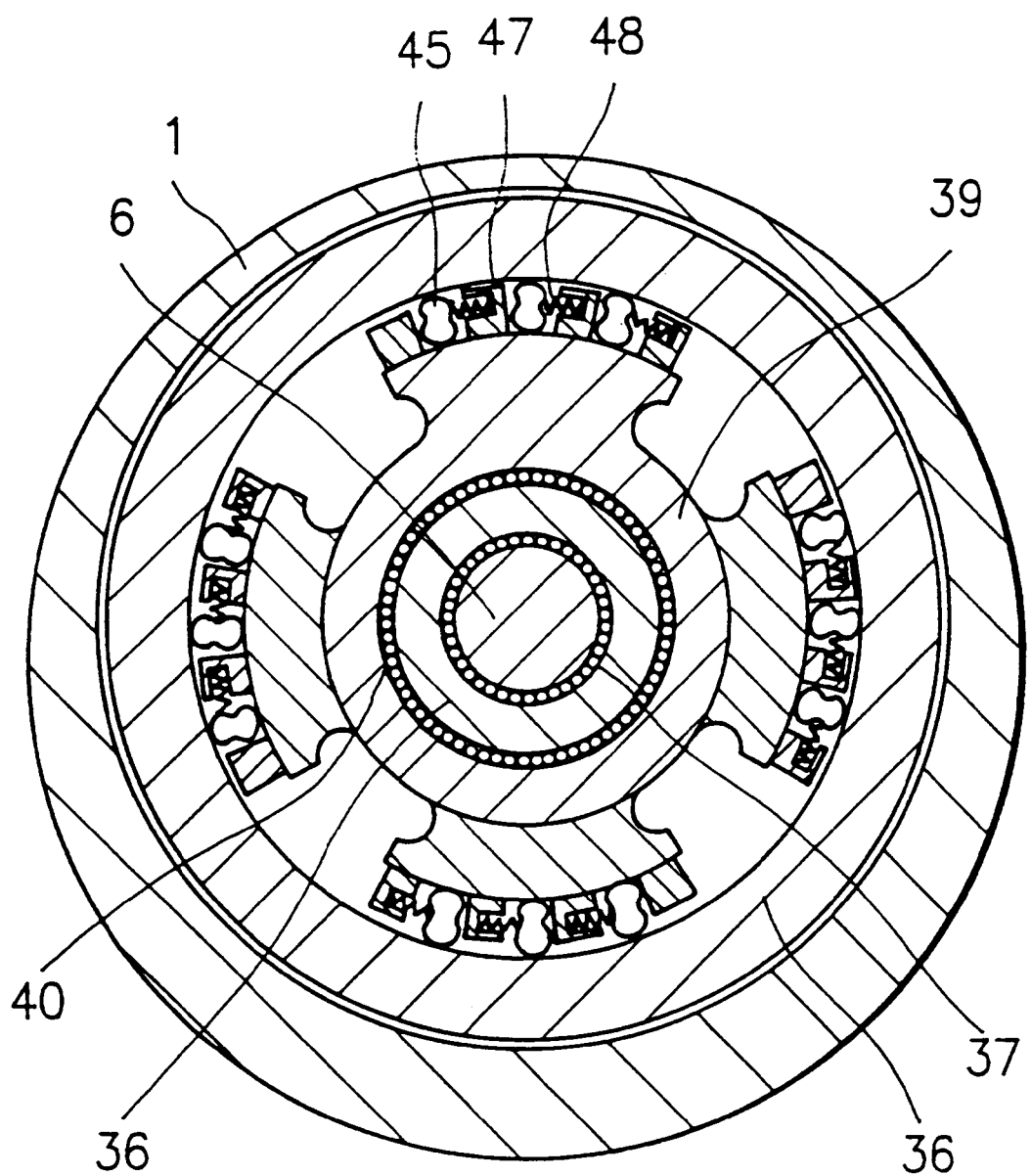
FIG. 4 is a cross-sectional view taken along a line 4—4 of FIG. 1 and viewed from the direction of arrow.
Figure 5:
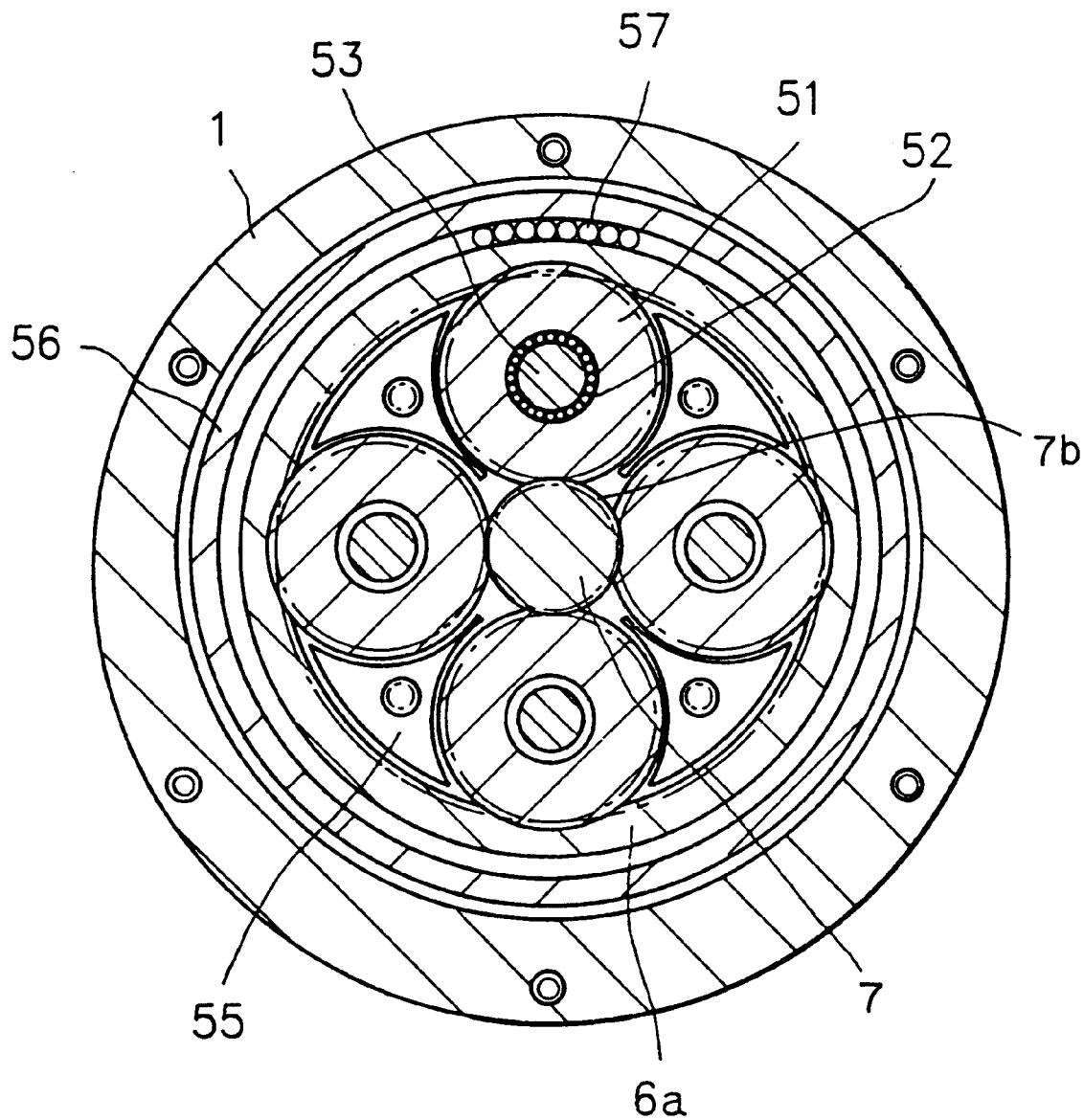
FIG. 5 is a cross-sectional view taken along a line 5—5 of FIG. 1 and viewed from the direction of arrow.
Figure 6:
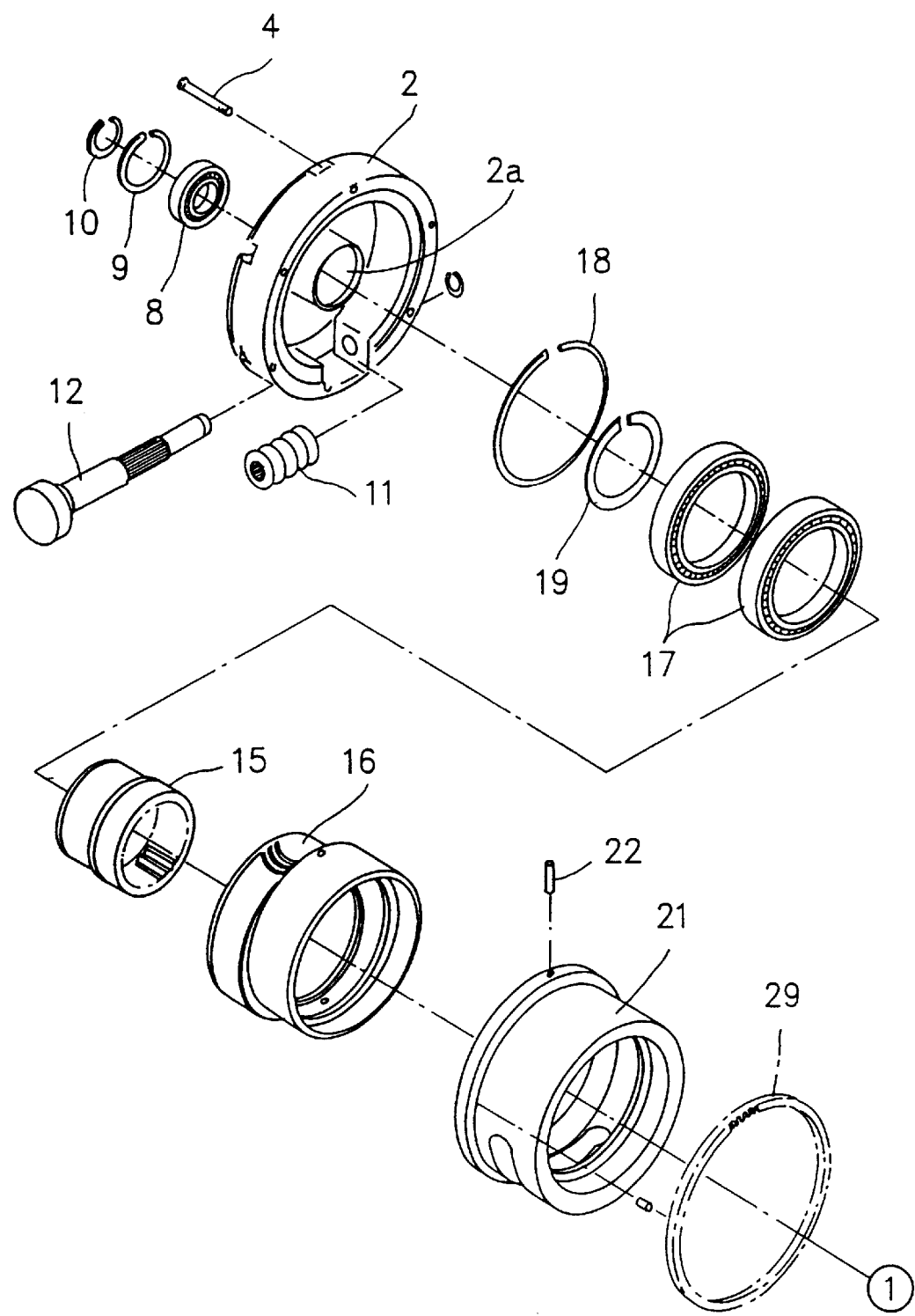
FIG. 6 is an exploded perspective view of the variable speed change gear.
Figure 7:
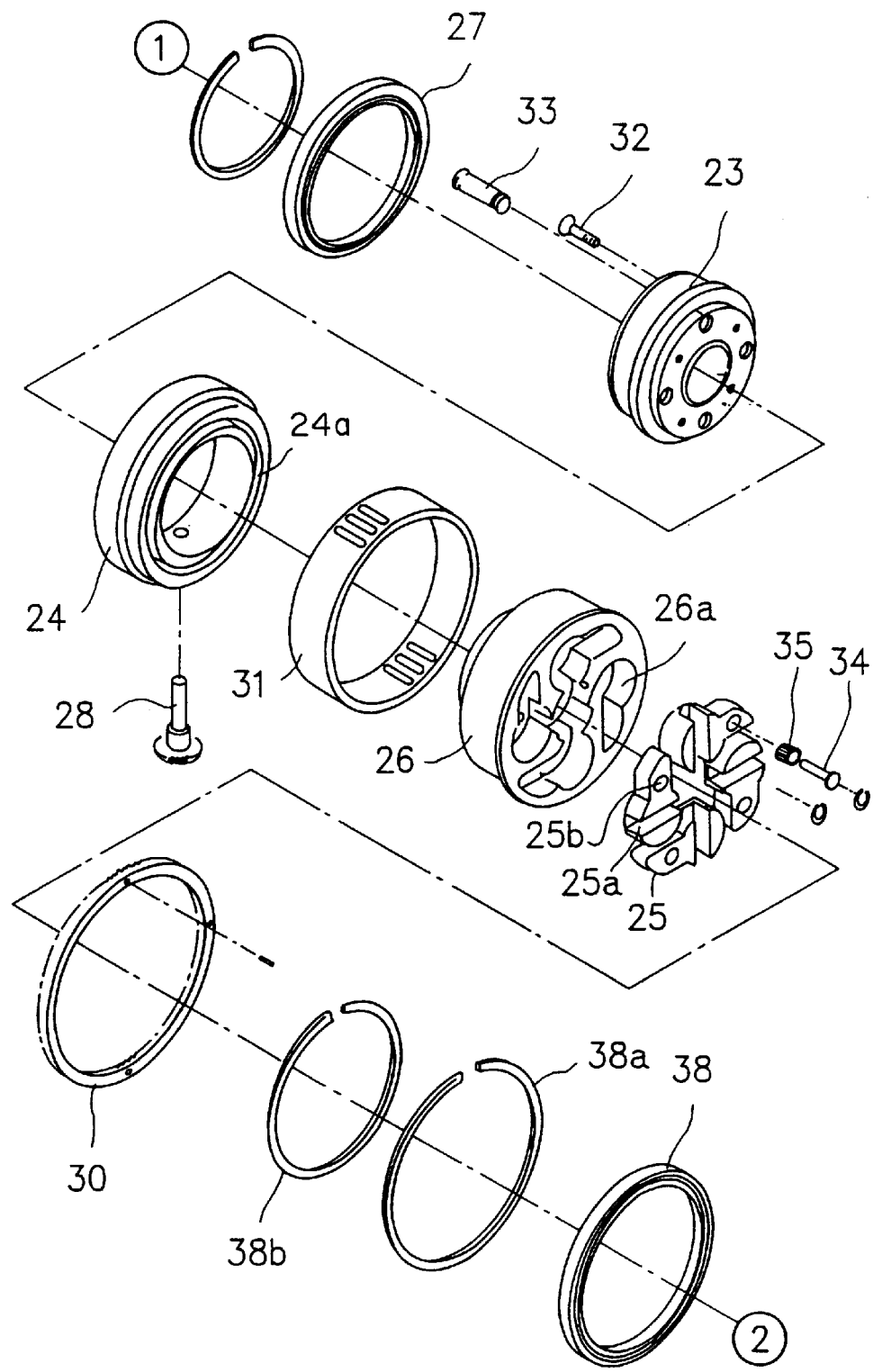
FIGS. 7 to 9 are exploded perspective views of the variable speed change gear.
Figure 8:
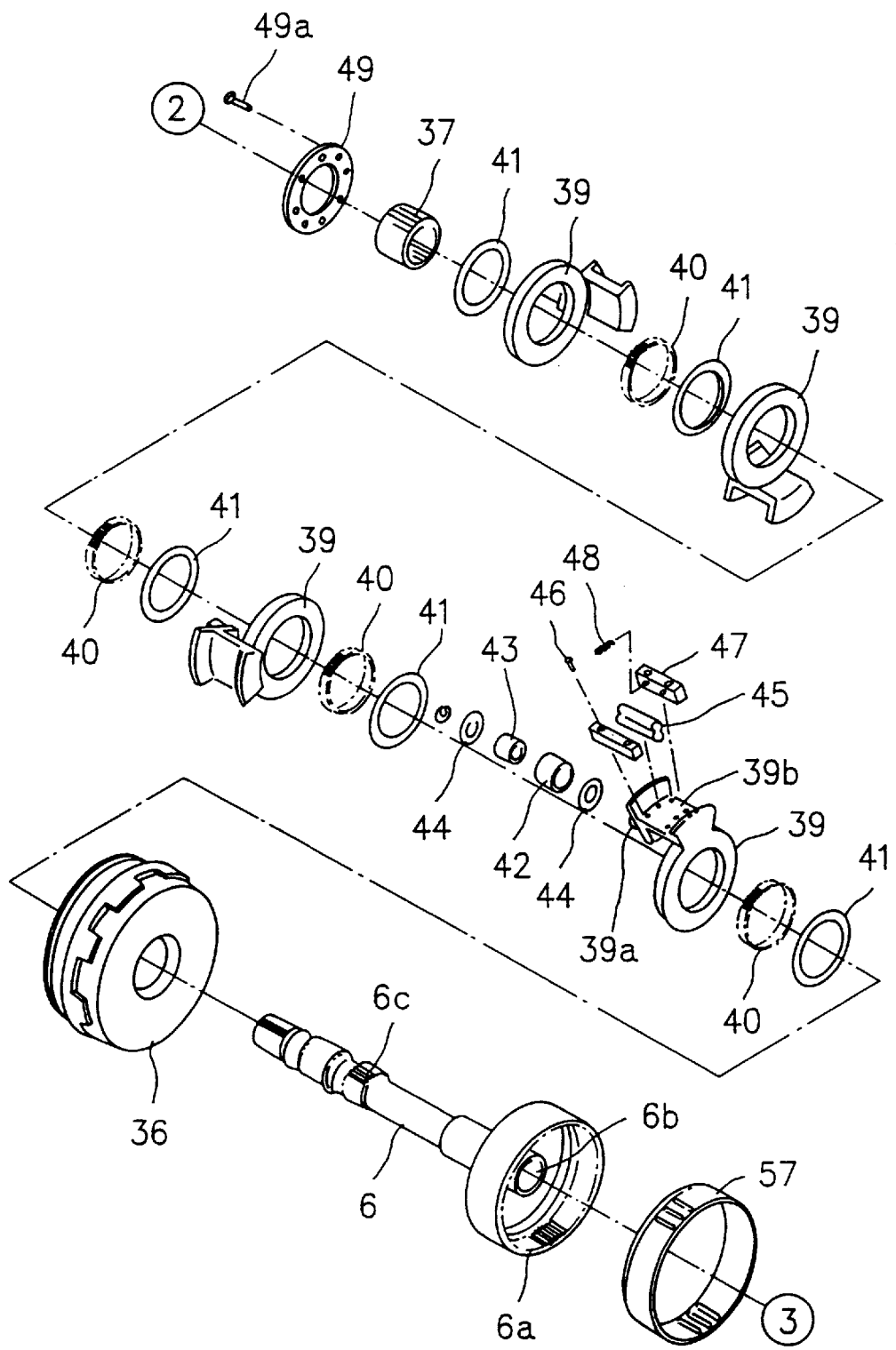
Figure 9:
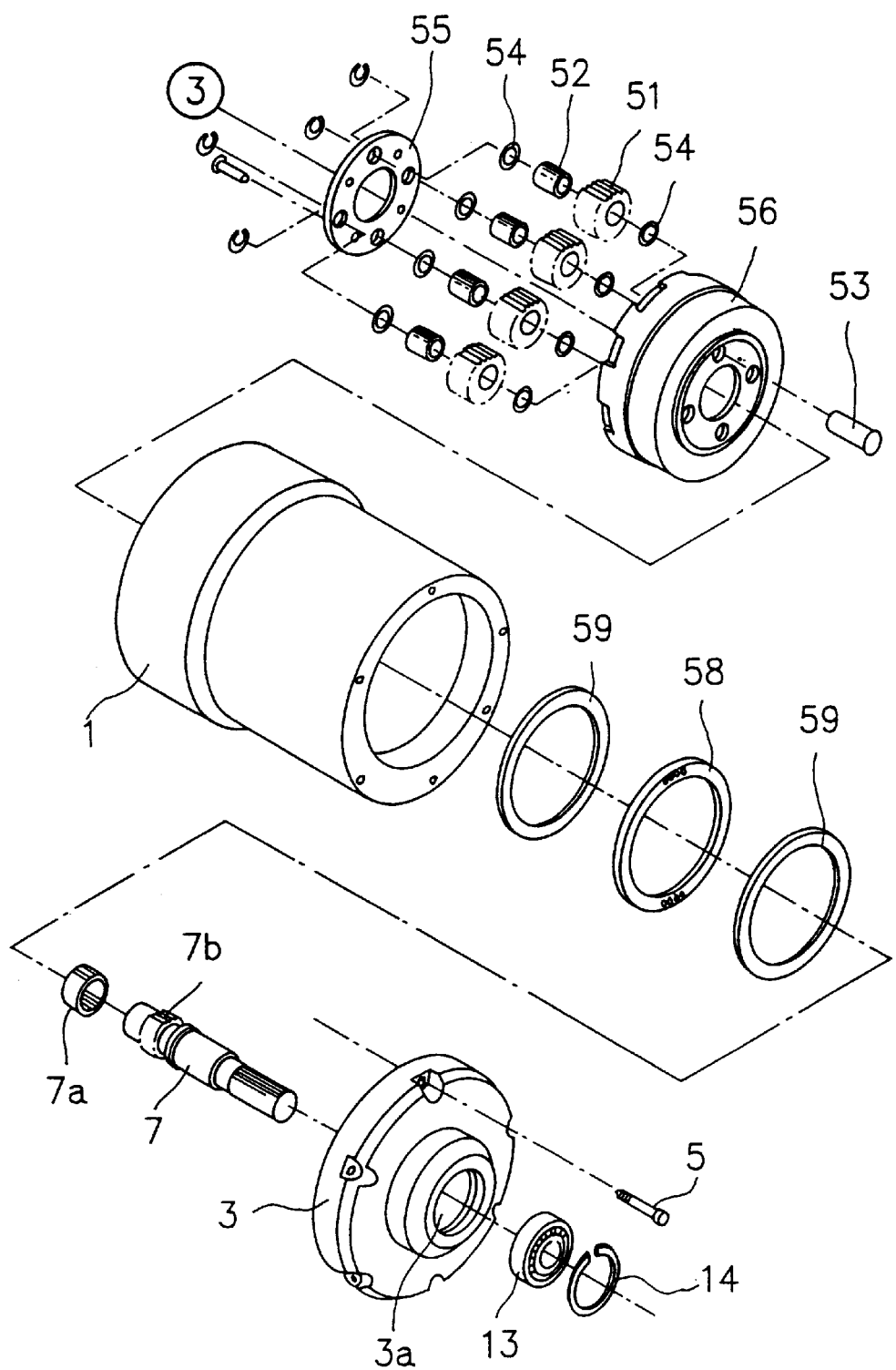
Figure 10:
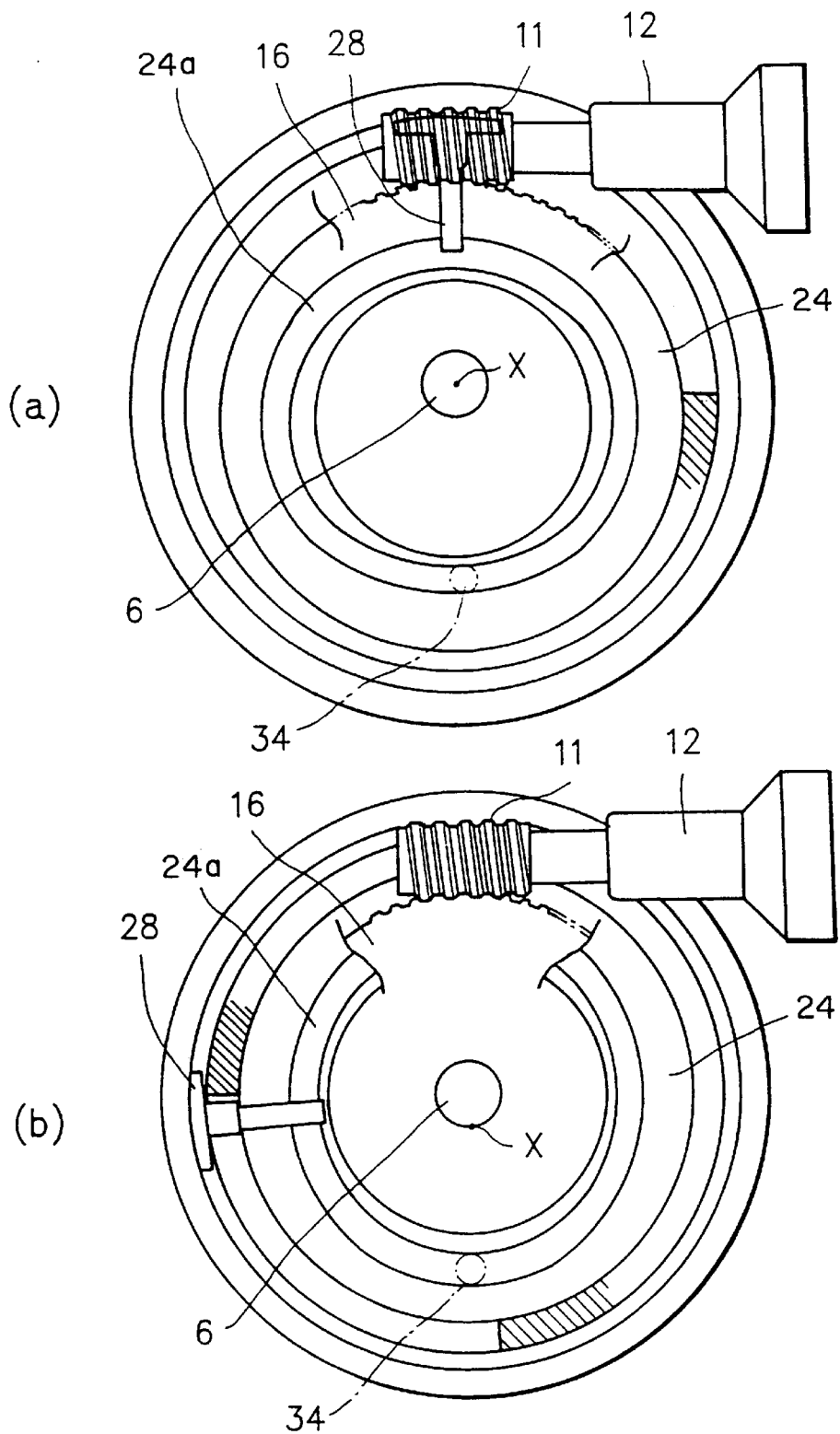
FIG. 10 is an explanatory view of an operation of the variable speed change gear.
Figure 11:
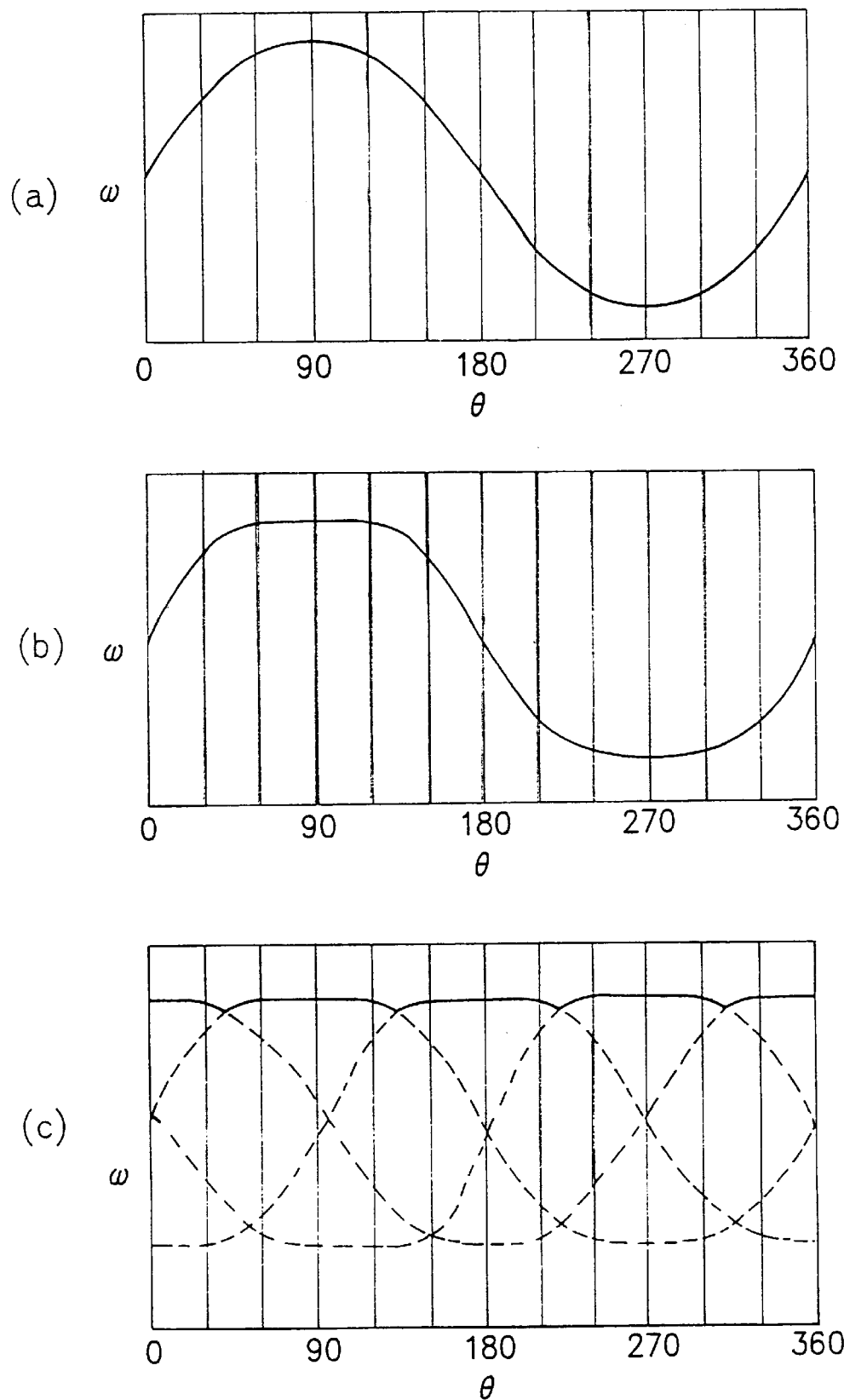
FIG. 11 is graphic representations showing variations in angular velocity.
Figure 12:
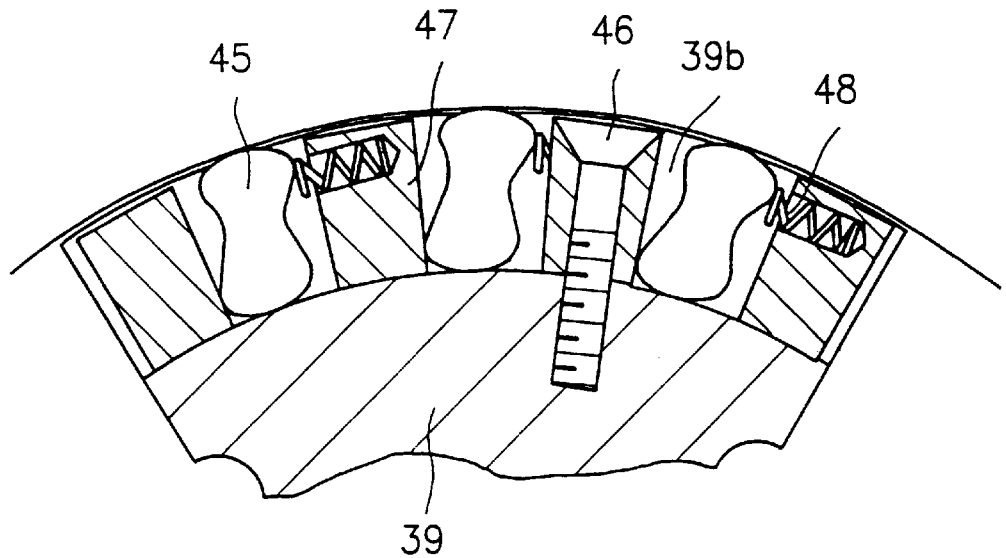
FIG. 12 is an enlarged fragmentary view of the variable speed change gear.

FIGS. 1 to 12 illustrate a first embodiment of the present invention: FIGS. 1 to 5 are cross-sectional views of a variable speed change gear; FIGS. 6 to 9 are exploded perspective views thereof; FIG. 10 is an explanatory view of operations of the variable speed change gear; FIG. 11 is a graphic representation showing variations in angular velocity; and FIG. 12 is an enlarged view of a principal part of the variable speed change gear. It is to be noted that chain dotted lines in FIGS. 6 to 9 are continuous with one another at respective positions indicated by the same encircled numerals corresponding to the respective diagrams.

The exterior of the variable speed change gear of this embodiment comprises a cylindrical transmission case 1 having open opposite ends, a case cover 2 for closing one end of the transmission case 1, and a case cover 3 for closing the other end of the transmission case 1, the case covers 2, 3 being secured to the transmission case 1 by means of bolts 4, 5. The variable speed change gear has a longitudinal axis slightly offset from the center of the transmission case 1. Concentrically arranged on the longitudinal axis slightly offset from the center of the transmission case 1 are an input shaft 6 for the input of an external driving force and an output shaft 7 for the output of the driving force.

The case cover 2 on the one hand includes an opening 2a for receiving the input shaft 6 which is rotatably supported via a ball bearing 8 and C-rings 9, 10 by the case cover 2. A worm gearing 11 is located within the case cover 2 and has an axis extending orthogonally to the input shaft 6. The worm gearing 11 is mounted on a control shaft 12 which is transversely introduced into the case cover 2.

The case cover 3 on the other hand includes an opening 3a for receiving the output shaft 7 which is rotatably supported via a ball bearing 13 and a C-ring 14 by the case cover 3.

One end of the input shaft 6 is provided with an enlarged tubular portion whose inner peripheral surface is formed with an internal gear 6a. The input shaft 6 has a recess 6b centered in the one end surface and a gear 6c formed on the outer periphery closer to the other end portion.

One end of the output shaft 7 is rotatably received in the recess 6b of the input shaft 6 by way of a roller bearing 7a. A gear 7b is formed on the outer periphery of the output shaft 7 closer to the one end.

The interior space of the transmission case 1 is radially slightly offset so as to allow the input shaft 6 to be centered. An internal gear 15 and a worm wheel 16 are arranged around the longitudinal axis offset relative to the input shaft 6. The gear 6c of the input shaft 6 meshes internally with the internal gear 15 of which outer periphery rotatably supports the worm wheel 16 by way of a pair of ball bearings 17 and C-rings 18, 19. A cylindrical offset housing 21 is coupled to the worm wheel 16 by means of pins 22 so that the offset housing 21 can be turned jointly with the worm wheel 16.

Accommodated within the offset housing 21 are a gear disk 23, an offset ring 24, a total of four movable blocks 25 serving as rockers, and a block housing 26, the interior space of the offset housing 21 being radially slightly offset so as to allow the input shaft 6 to be centered. The gear disk 23 is rotatably supported via a ball bearing 27 by the worm wheel 16 and includes a gear 23a centrally and integrally formed on its one end side, the gear 23a engaging internally with the internal gear 15. The offset ring 24 is rotatably supported between the gear disk 23 and the block housing 26 and includes an elliptical groove 24a formed in the surface confronting the block housing 26.

A pinion gear 28 is rotatably positioned on the peripheral surface of the offset ring 24 and meshes with a ring gear 29 secured to the offset housing 21 and a ring gear 30 secured to the transmission case 1. The block housing 26 is supported via a roller bearing 31 by the offset housing 21 and has one end secured to the gear disk 23 by means of a bolt 32. The other end of the block housing 26 is provided with a total four circumferentially arranged and axially extending through-holes 26a, the four through-holes 26a accommodating the four movable blocks 25, respectively The movable blocks 25 each include a groove 25a extending radially of the block housing 26, with the central portion on the back side of the groove 25a being rotatably supported by a shaft 33 secured to the gear disk 23. Each movable block 25 also includes a hole 25b at a position offset radially from its axis of rotation, the hole 25b receiving via a multiplicity of rollers 35 a pin 34 whose tip is fitted into the groove 24a of the offset ring 24.

A cylindrical clutch cylinder 36 faces the block housing 26 and is rotatably supported via a roller bearing 37 by the input shaft 6 and via a ball bearing 38 and a pair of C-rings 38a, 38b by the transmission case 1. Accommodated within the clutch cylinder 36 are a total of four circumferentially arranged variable rings 39 acting as driven rotary elements which in turn are rotatably supported via a multiplicity of rollers 40 by the clutch cylinder 36. The variable rings 39 are arranged concentrically with one another by way of washers 41 and each include integrally at a circumferential portion thereof a rod 39a extending toward the block housing 26 and a groove 39b confronting the inner peripheral surface of the clutch cylinder 36. It is to be appreciated in this case that ringed portions of the variable rings 39 are staggered so that their respective rods 39a and grooves 39b are axially coincident with one another. The variable rings 39 are correspondingly associated with the movable blocks 25, with the rods 39a of the variable rings 39 being radially slidably fitted into the grooves 25a of the movable blocks 25 by way of a spacer ring 42, a roller bearing 43 and a pair of washers 44. Within the groove 39b of each of the variable rings 39 are a plurality of sprags 45 constituting transmission members in the form of as one-way transmitting means, with the sprage 45 being interposed so as to allow their rocking actions between a plurality of sprage blocks 47 fastened in the groove 39b by means of screws 46. In this case, each sprag blocks 45 is biased unidirectionally by springs 48 carried on the associated sprag blocks 47. As a result, the sprags 45 come into press-contact with the inner peripheral surface of the clutch cylinder 36 by biasing forces of the springs 48. When the variable rings 39 have a higher rotational speed relative to the clutch cylinder 36, the sprags 45 are interlocked by sliding frictions with the inner peripheral surface of the clutch cylinder 36 to thereby perform transmission of the rotational forces. When the variable rings 39 have a lower rotational speed relative to the clutch cylinder 36, they slide over the inner peripheral surface of the clutch cylinder 36 to thereby permit a difference in rotational speeds between the variable rings 39 and the clutch cylinder 36. The variable rings 39 are each retained by a ring holder 49 having a ring portion attached to the clutch cylinder 36, the ring holder 49 being secured to the clutch cylinder 36 by means of bolts 49a.

The gear 7b of the output shaft 7 is intended to mate with a total of four planetary gears 51 which in turn engage internally with the internal gear 6a of the input shaft 6. Each of the planetary gears 51 is rotatably mounted on a planetary carrier 56 by way of a multiplicity of rollers 52, a shaft 53, a washer 54 an a ring holder 55, the planetary carrier 56 being anchored to the clutch cylinder 36. A roller bearing 57 intervenes between the planetary carrier 56 and the internal gear 6a, with a thrust bearing 58 and a pair of washers 59 being interposed between the planetary carrier 56 and the end surface of the other case cover 3.

In the above configuration, when the input shaft 6 is rotated by an external driving force, the rotational force of the input shaft 6 is transmitted through the gear 6c, the internal gear 15 and the gear 23a to the gear disk 23, allowing the gear disk 23, the block housing 26 and the movable blocks 25 to be jointly turned. Since the rods 39a of the variable rings 39 are interposed to the grooves 25a of the movable blocks 25, the variable rings 39 jointly rotate with the block housing 26. The rotational force of the variable rings 39 is transmitted by way of the sprags 45 to the clutch cylinder 36, allowing the clutch cylinder 36 and the planetary carrier 56 to be jointly turned. This results in revolutions of the planetary gears 51 around the output shaft 7, the resultant revolving forces of the planetary gears 51 being transmitted to the gear 7b of the output shaft 7. At that time, since the rotational speed of the planetary carrier 56 is decelerated in the process of its transmission from the gear 6c of the input shaft 6 to the internal gear 15, there occurs a difference in rotational speeds between the internal gear 6a of the input shaft 6 and the planetary carrier 56. This results in a rotation of the planetary gears 51, allowing the output shaft 7 to be turned with a delay corresponding to this rotation. Thus, in the above configuration, the input shaft 6 to the block housing 26 constitute an input side rotator whereas the clutch cylinder 36 to the output shaft 7 constitute an output side rotator.

Then, when the control shaft 12 is rotated during the above operation, the worm wheel 16 rotates in accordance with the amount of rotation of the control shaft 12, allowing the offset housing 21 to be turned jointly with the worm wheel 16. At that time, due to the offset of the axis of the offset housing 21 relative to the axis of the transmission case 1, the axis X of rotation of the gear disk 23 and block housing 26 within the offset housing 21 is displaceable from a position coincident with the axis of the input shaft 6 as shown in FIG. 10(a) to a position offset radially of the transmission case 1 as shown in FIG. 10(b). This offset will cause positions of coupling of the rods 39a of the variable rings 39 with the grooves 25a of the movable blocks 25 to be radially offset. Rotations of the block housing 26 are thus transmitted to the variable rings 39 while being permitted by reciprocations of the rods 39a of the variable rings 39 within the grooves 25a of the movable blocks 25, so that the angular velocity omega of the variable rings 39 varies at the rate of one cycle per rotation relative to the rotations of the block housing 26 as shown in FIG. 11(a). It is to be noted in this case that the phase theta of variation in angular velocity is shifted by 90 degrees for each variable ring 39, among which a rotational force of the variable ring 39 maximizing the angular velocity omega is transmitted to the output side by way of the sprags 45 and the cylinder 36. Furthermore, since the movable blocks 25 cause the pins 34 to engage with the elliptical groove 24a provided in the offset ring 24, rotations of the block housing 26 will allow the movable blocks 25 to individually rock around the shaft 33 by guidance of the groove 24a. This rocking is in synchronism with variations in angular velocity omega of the variable rings 39 so that as shown in FIG. 11(b) the angular velocity omega of the variable rings 39 is corrected to be substantially flat in the vicinity of its maximum value.

In this case, due to the 90 degree phase shifts of the angular velocity omega of the variable ring 39, corrected angular velocities omega are continuously derived for each of the variable rings 39 as shown in FIG. 11(c), ensuring substantially constant angular velocities omega to be transmitted to the output side. Also, the offset of the offset housing 21 allows the pinion gear 28 to move in circumferential direction of the transmission case 1 while revolving between the ring gear 29 on the offset housing 21 side and the ring gear 30 on the transmission case 1 side, with the result that the offset ring 24 turns in the same direction while following the pinion gear 28. It will be appreciated in this case that the amount of rotation of the pinion gear 28 results in half of that of the offset ring 24 since the offset ring 24 revolves by way of rolling action of the pinion gear 28. This is due to the fact that the orientation of the groove 24a of the offset ring 24 is so altered that the rocking of the movable blocks 25 is at all times synchronized with variations in angular velocity of the variable rings 39. Although the movable blocks 25 are allowed to rock even when the offset housing 21 is not offset, the angular velocity of the variable rings 39 will not be corrected since in this case the centers of rocking of the movable blocks 25 are coincident with the axes of the rods 39a of the variable rings 39. In this manner, rotational forces of the variable rings 39, whose angular velocities vary in accordance with the amount of offset of the offset housing 21, are fetched by the one-way transmission mechanism consisting of the scrubs 45 and clutch cylinder 36 and are then transmitted to the output shaft 7. Thus, the rotational speed of the output shaft 7 will be steplessly varied in response to the amount of rotation of the control shaft 12.

Figure 13:
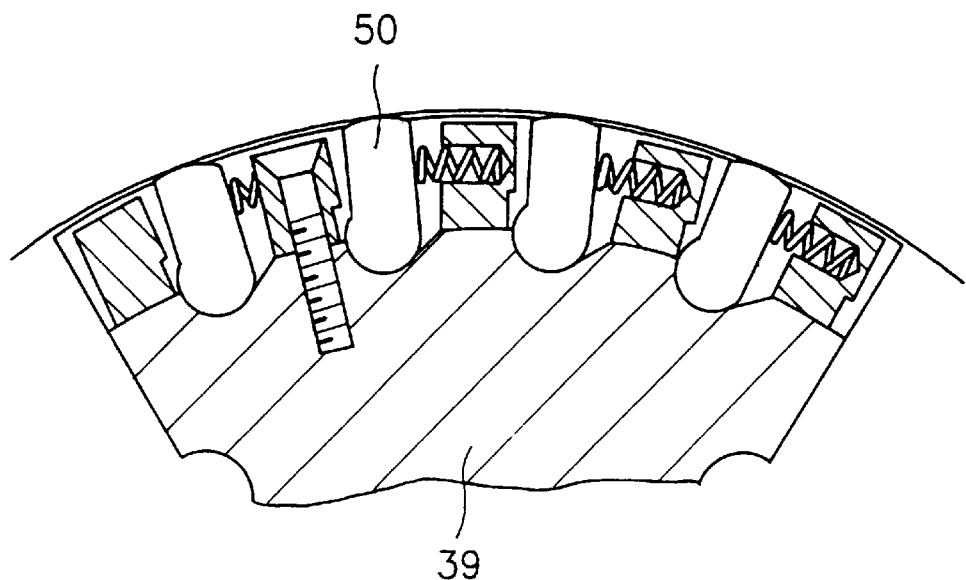
FIG. 13 is an enlarged fragmentary view of another variable speed change gear showing a variant of the first embodiment.
Figure 14:
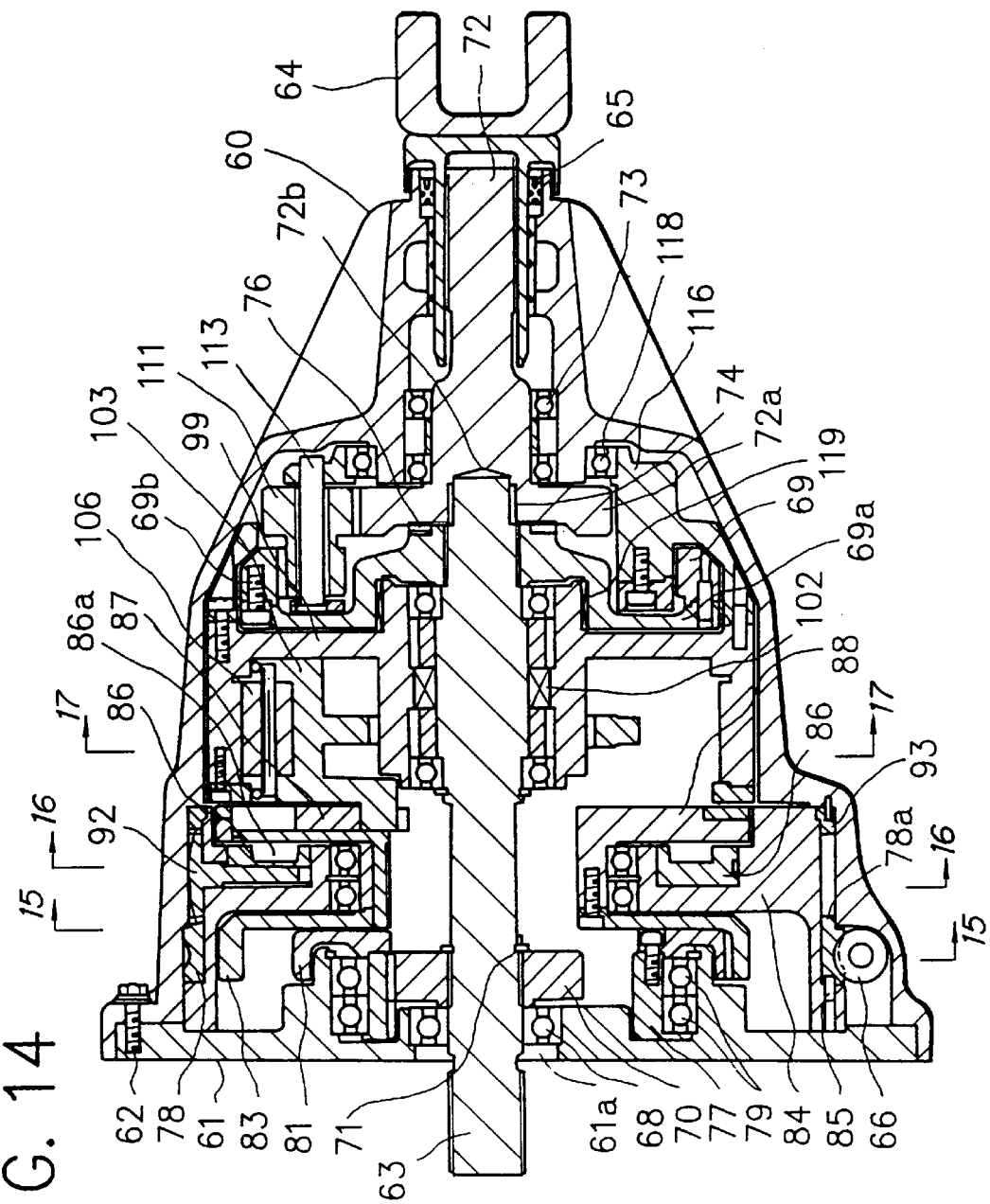
FIG. 14 is a cross-sectional side view of a further variable speed change gear showing a second embodiment of the present invention.
Figure 15:
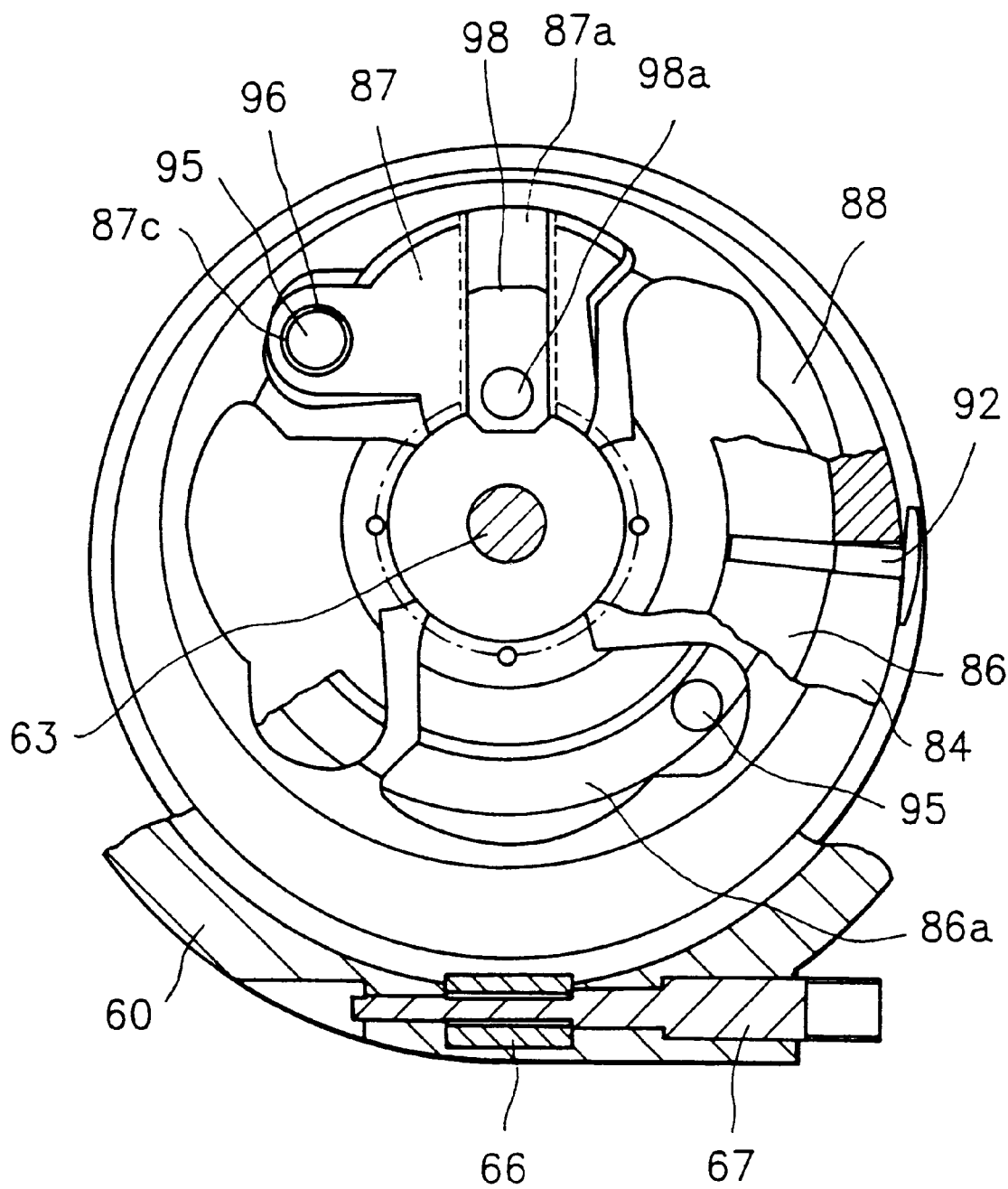
FIG. 15 is a cross-sectional view taken along a line 15—15 of FIG. 14 and viewed from the direction of arrow.
Figure 16:
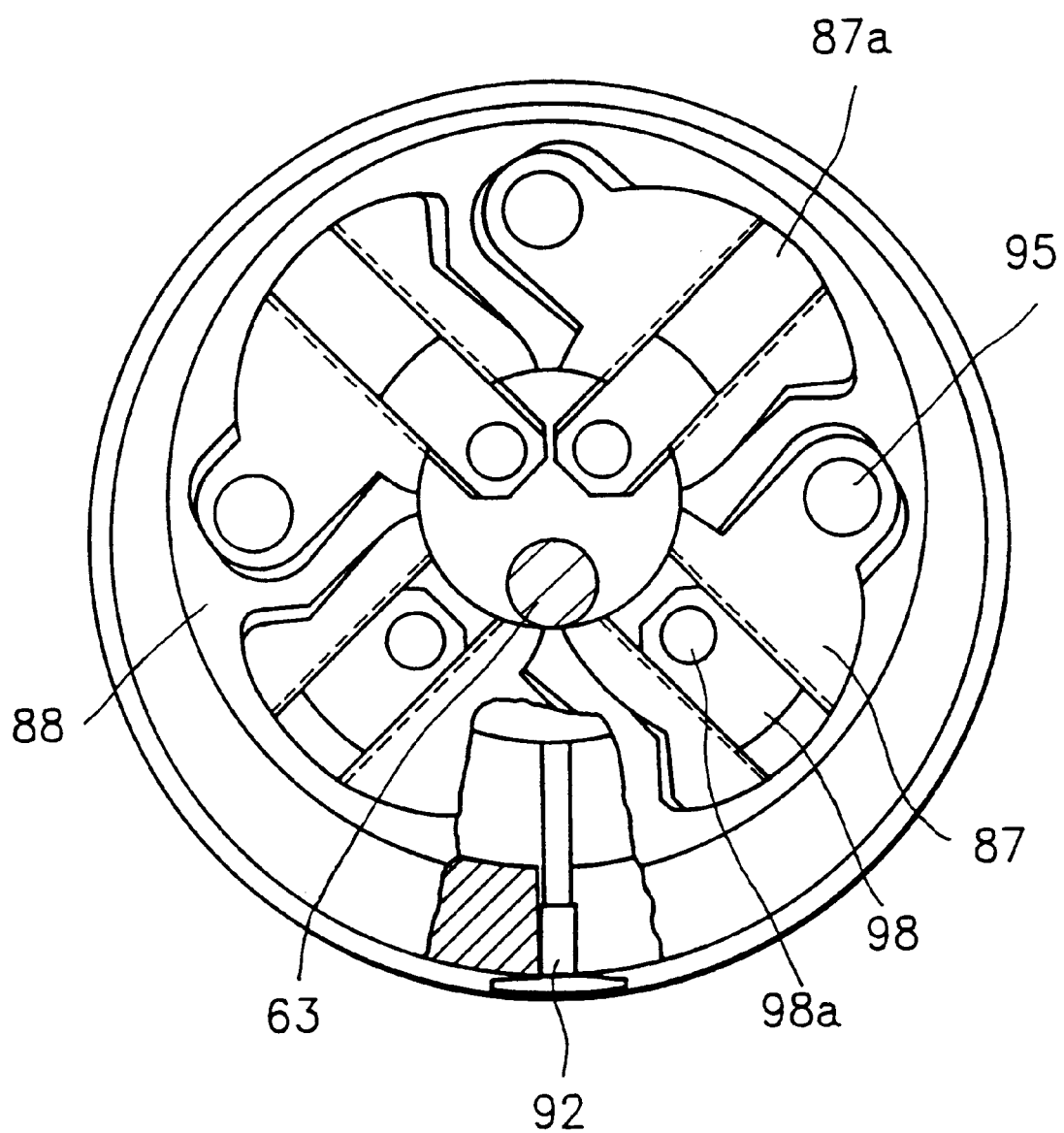
FIG. 16 is a cross-sectional view taken along a line 16—16 of FIG. 14 and viewed from the direction of arrow.
Figure 17:
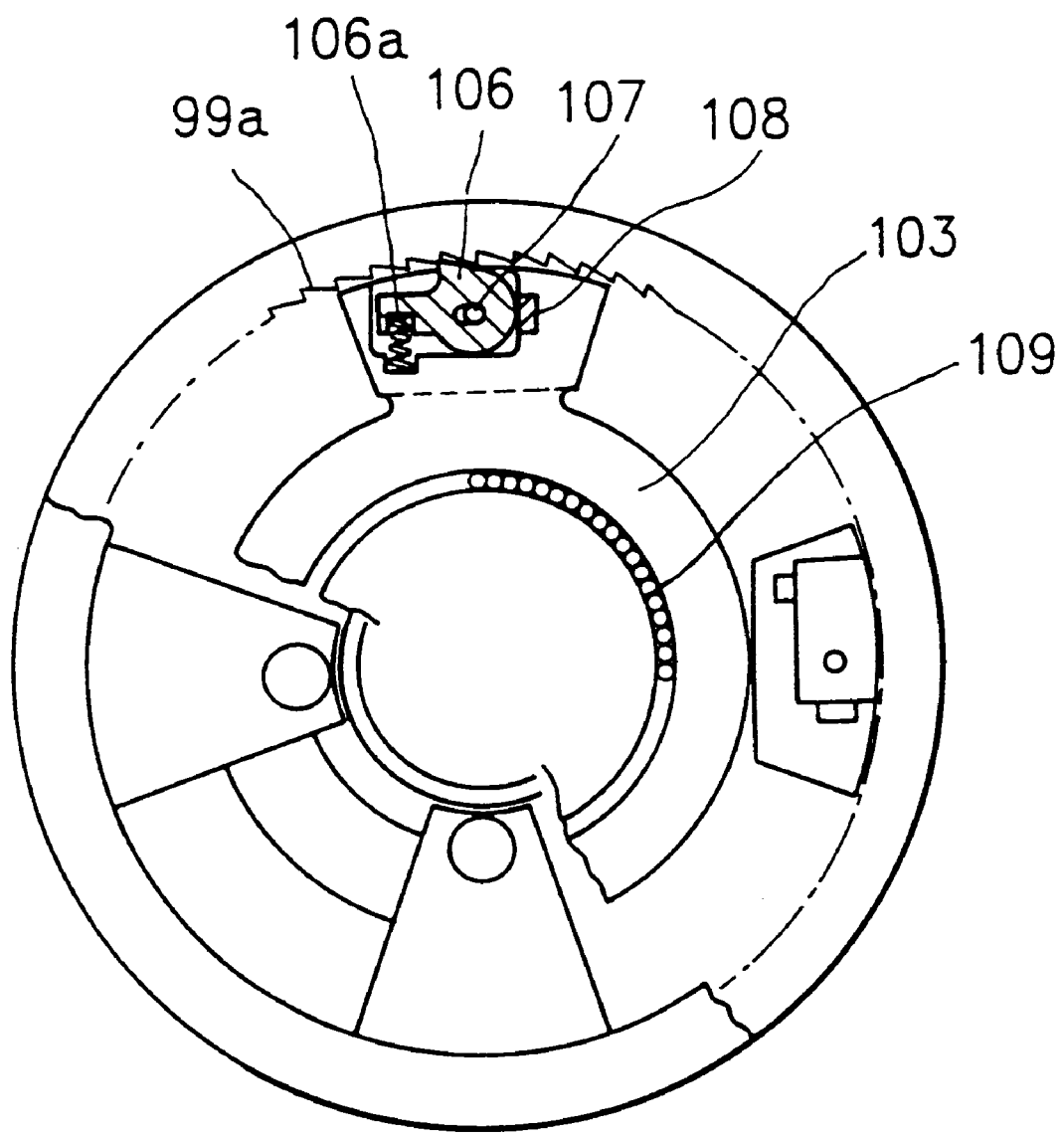
FIG. 17 is a cross-sectional view taken along a line 17—17 of FIG. 14 and viewed from the direction of arrow.
Figure 18:
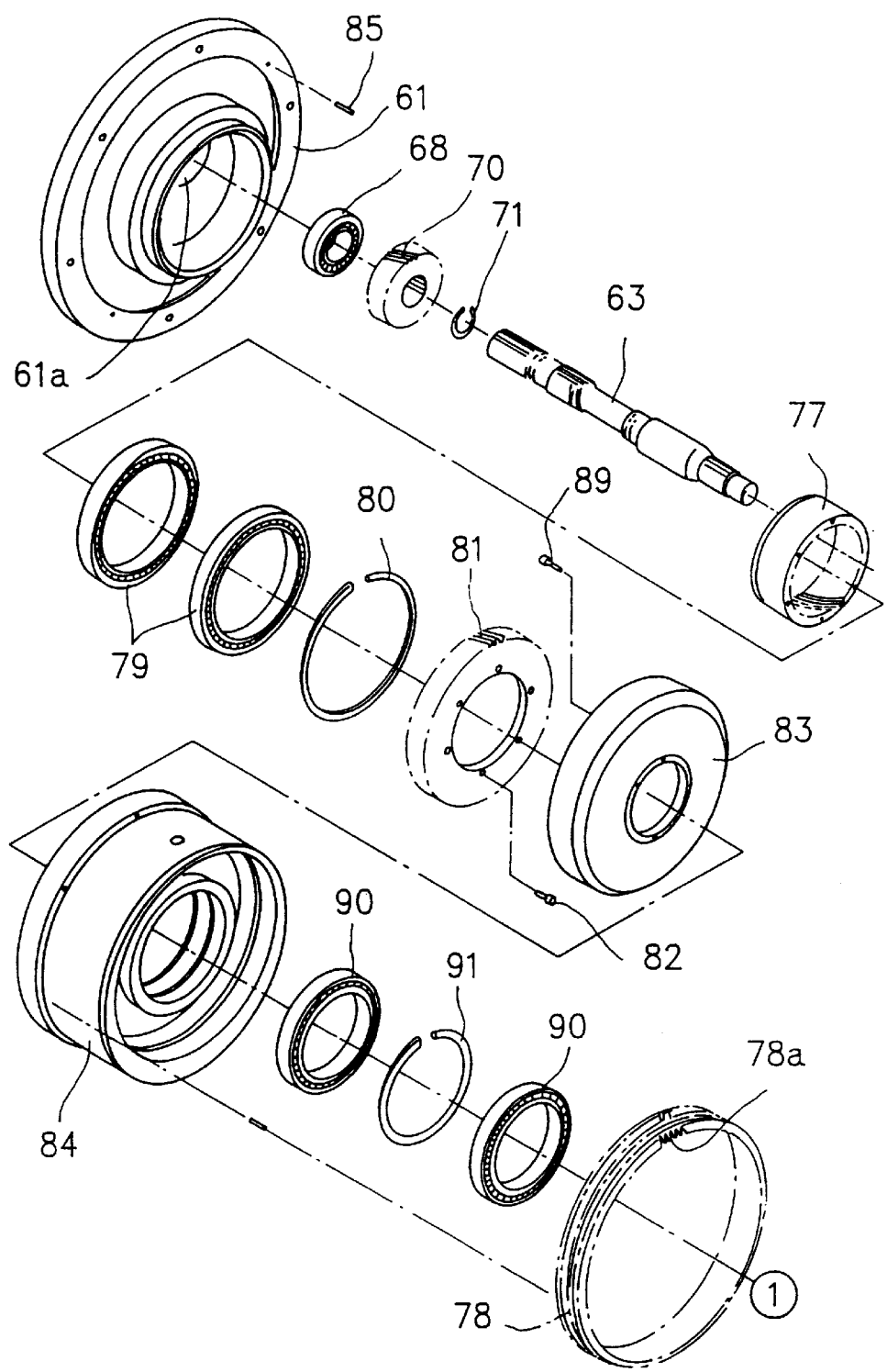
FIGS. 18 to 22 are exploded perspective views of the variable speed change gear.
Figure 19:
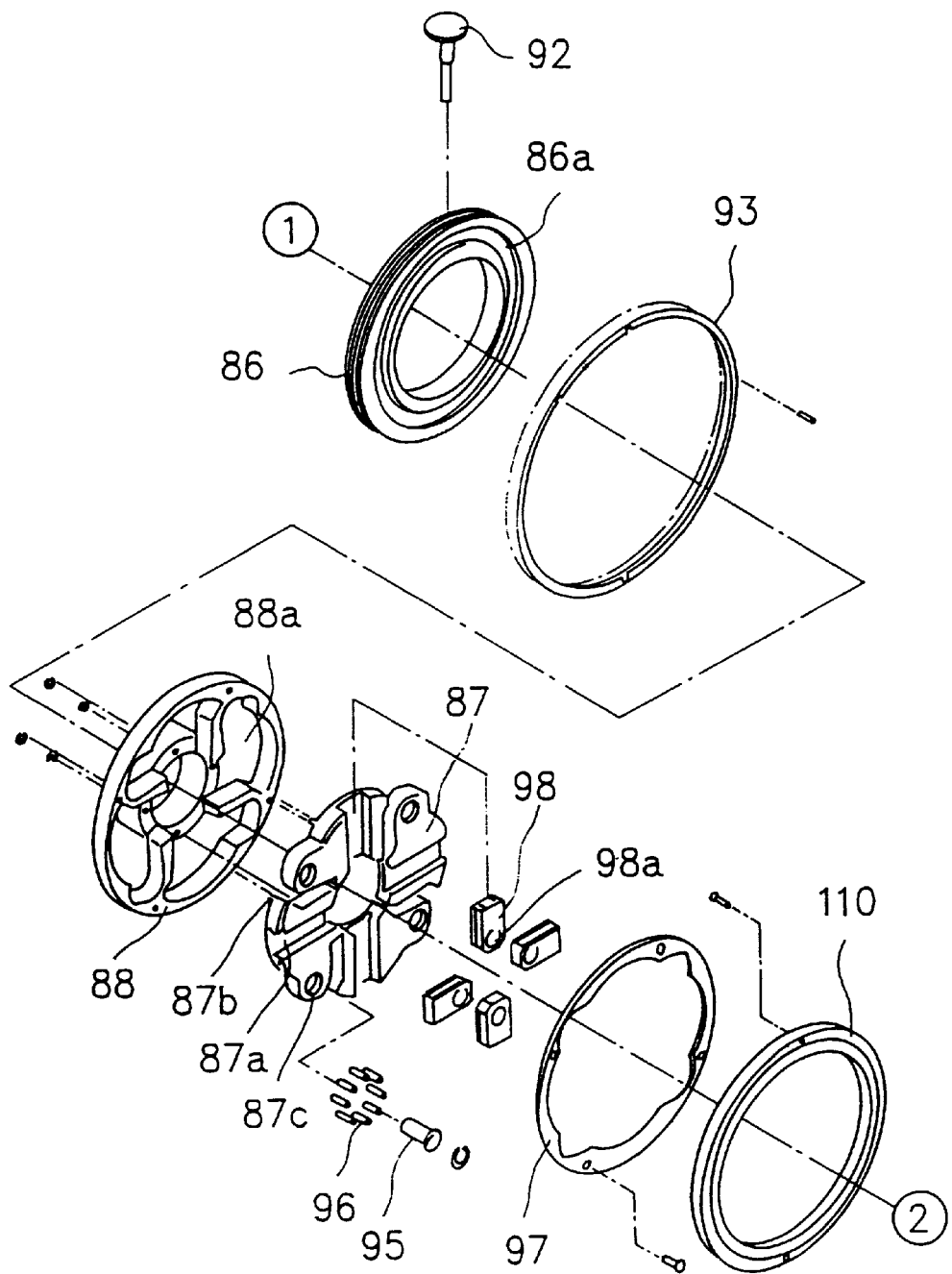
Figure 20:
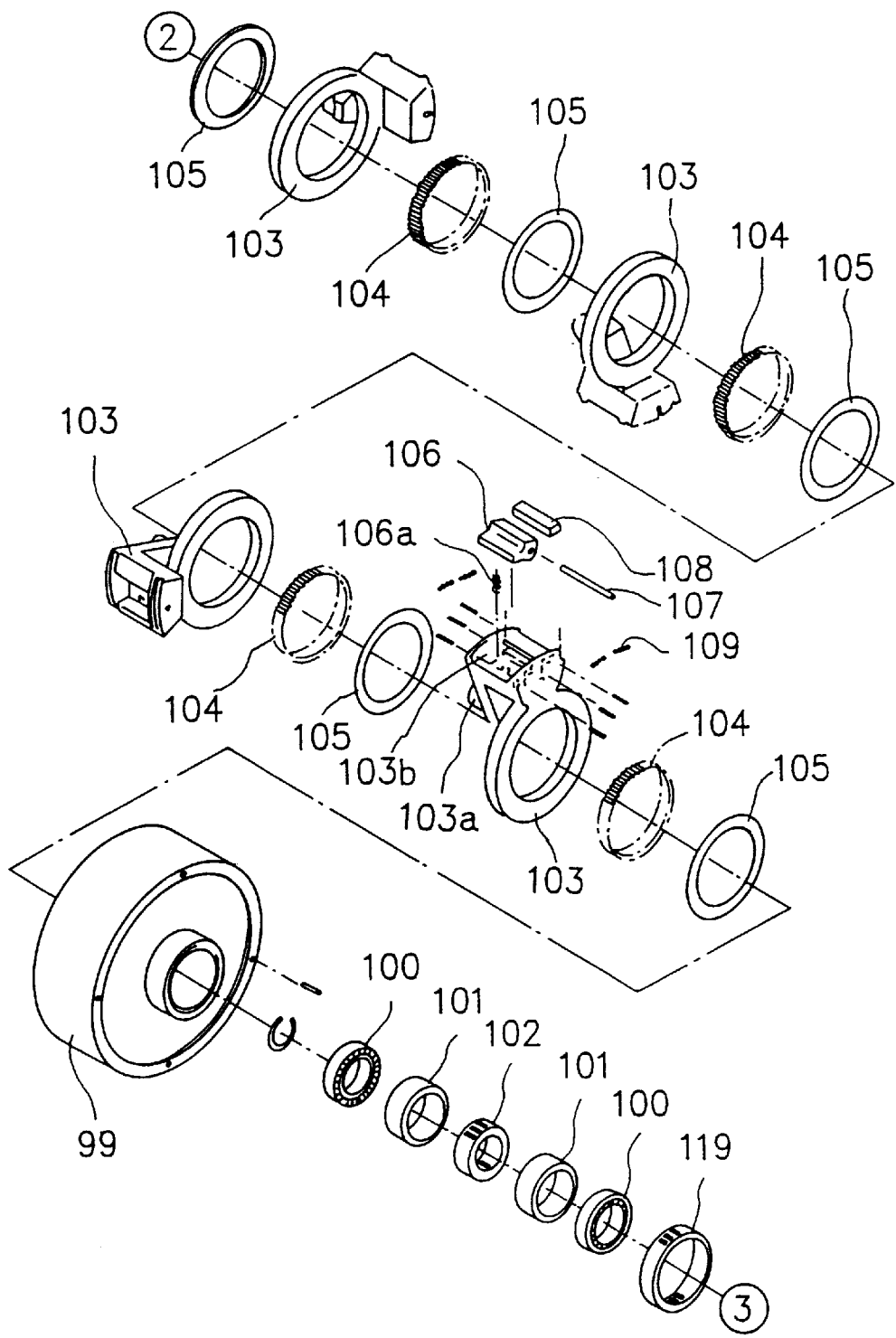
Figure 21:
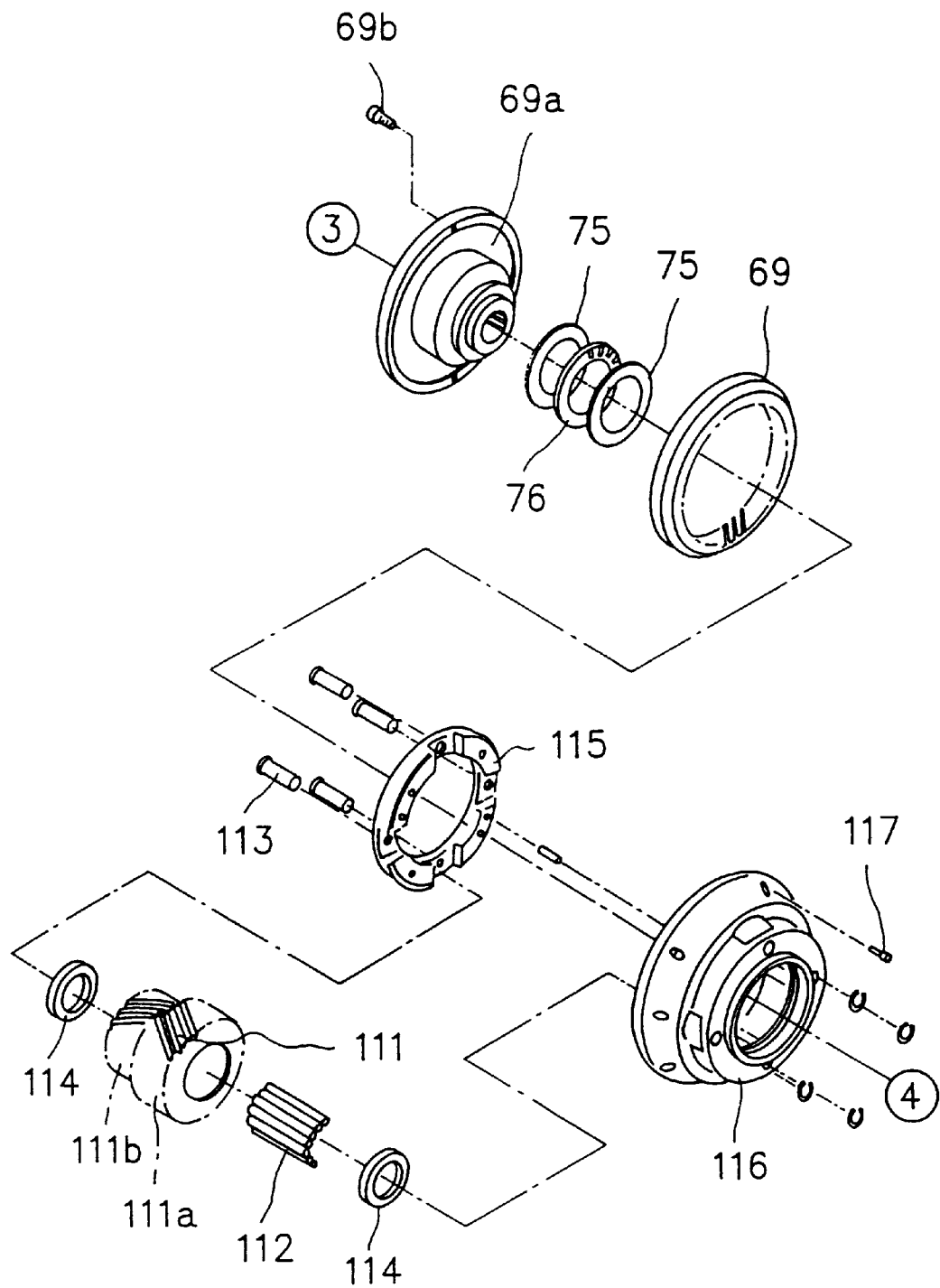
Figure 22:
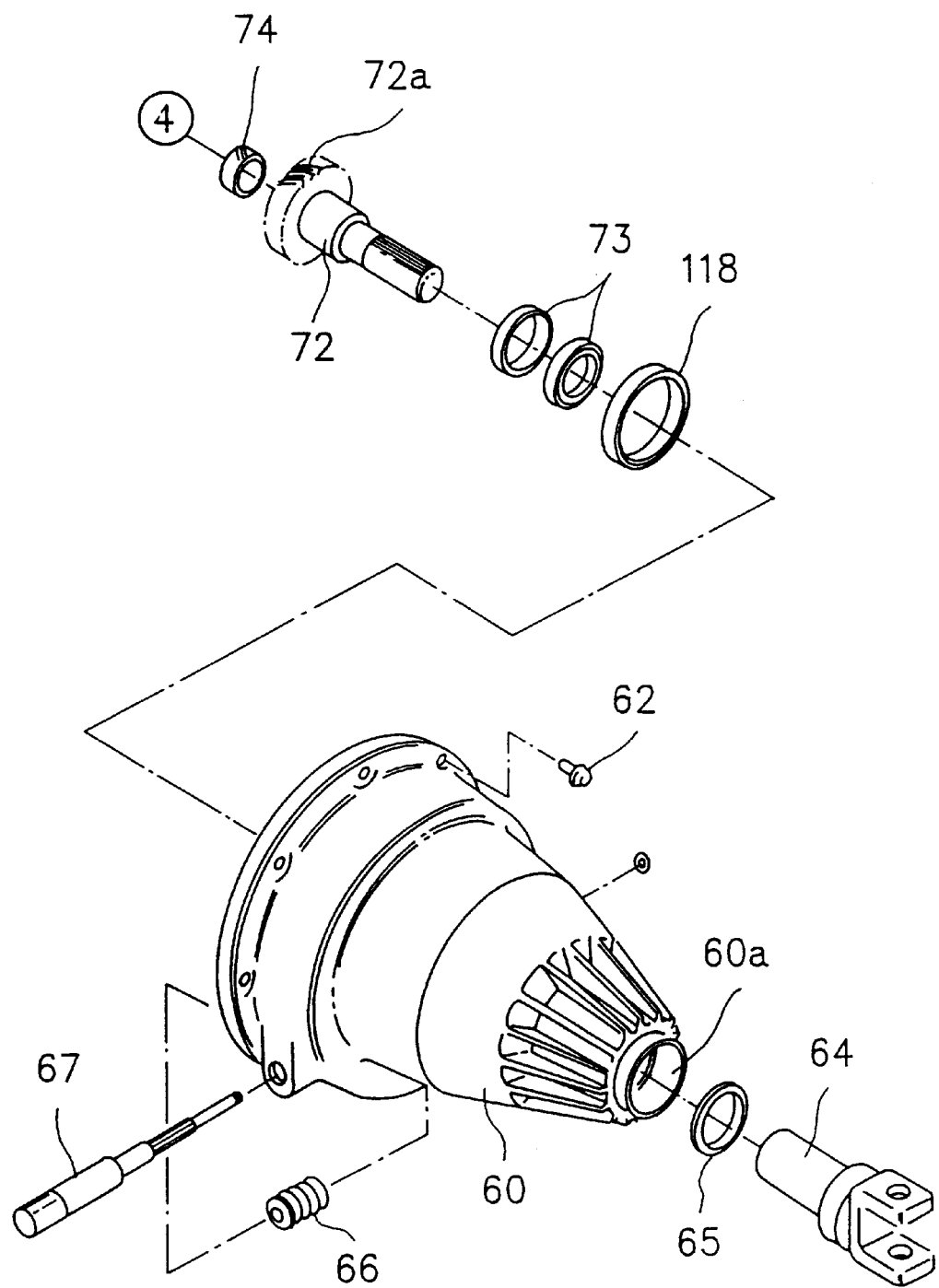

Although in the above embodiment the sprags 45 are accommodated within the groove 39b of the variable ring 39 partitioned by the plurality of sprag blocks 47 as shown in FIG. 12, use may be made of sprags 50 whose one end surfaces are circular as shown in FIG. 13, with the formation of circular surfaces in the groove 39b of the variable ring 39 which come into face-to-face contact with the circular surfaces of the sprags 50, thereby ensuring stable rocking of the sprags 50 along these circular surfaces as well as more secure action as the one-way transmission mechanism.

FIGS. 14 to 22 illustrate a second embodiment of the present invention: FIGS. 14 to 17 are cross-sectional views of a variable speed change gear; and FIGS. 18 to 22 are exploded perspective views thereof. It is to be noted that chain dotted lines in FIGS. 18 to 22 are continuous with one another at respective positions indicated by the same encircled numerals corresponding to the respective diagrams.

The exterior of the variable speed change gear of this embodiment comprises a transmission case 60 having one open end, and a case cover 61 for closing the one end of the transmission case 60, the case cover 61 being secured to the transmission case 60 by means of bolts 62. Concentrically arranged on the longitudinal axis slightly offset from the center of the transmission case 60 are an input shaft 63 for the input of an external driving force and an output shaft 64 for the output of the driving force.

The transmission case 60 includes an opening 60a for receiving the output shaft 64 which is rotatably supported via a sealing medium 65 by the transmission case 60. A worm gearing 66 is located within the transmission case 60 and has an axis extending normal to the input shaft 63. The worm gearing 66 is mounted on a control shaft 67 which is transversely introduced into the transmission case 60.

The case cover 61 includes an opening 61a for receiving the input shaft 63 which is rotatably supported via a ball bearing 68 by the case cover 61.

The input shaft 63 has an internal gear 69 lying on its one end side and a gear 70 fitted to its other end side by means of a C-ring 71. The internal gear 69 is mounted on the input shaft 63 by way of a gear disk 69a which is coupled to the internal gear 69 by means of bolts 69b.

A gear shaft 72 is coupled to one end of the output shaft 64 and is rotatably supported via a pair of ball bearings 73 by the transmission case 60. One end of the gear shaft 72 is formed with a gear 72a which has one end surface provided with a recess 72b centrally located for rotatably receiving one end of the input shaft 63 by way of a roller bearing 74. A pair of thrust washers 75 and a thrust bearing 76 are interposed between the one end surface of the gear shaft 72 and the gear disk 69a.

The interior space of the transmission case 60 is radially slightly offset so as to allow the input shaft 63 to be centered. An internal gear 77 and a worm wheel 78 are arranged around the longitudinal axis offset relative to the input shaft 63. The gear 70 of the input shaft 63 meshes internally with the inner peripheral surface of the internal gear 77 which is rotatably supported via a pair of ball bearings 79 and a C-ring 80 by the case cover 61. A gear 81 greater in diameter than the gear 70 is fastened to the internal gear 77 by means of bolts 82 and is internally engaged with an internal gear disk 83. A cylindrical offset housing 84 is coupled to the worm wheel 78 by means of pins 85 so that the offset housing 84 can be turned jointly with the worm wheel 78. A ring gear 78a is formed at one end of the worm wheel 78.

Accommodated within the offset housing 84 are an internal gear disk 83, an offset ring 86, a total of four movable blocks 87 and a block housing 88, the interior space of the offset housing 84 being radially offset so as to allow the input shaft 63 to be centered. The internal gear disk 83 is secured via bolts 89 to the block housing 88 which is rotatably supported via a pair of ball bearings 90 and a C-ring 91 by the offset housing 84. The offset ring 86 is rotatably supported within the offset housing 84 and includes an elliptical groove 86a formed in the surface confronting the block housing 88. A pinion gear 92 is rotatably positioned on the peripheral surface of the offset ring 86 and meshes with a ring gear 78a formed on the worm wheel 78 associated with the offset housing 84 and a ring gear 93 secured to the transmission case 60. The block housing 88 includes a total four circumferentially arranged through-holes 88a, each through-hole 88a accommodating the movable block 87. The movable blocks 87 each include a groove 87a extending radially of the block housing 88, with a rod 87b provided on the back side of the groove 87a being rotatably supported via a C-ring 94 by the block housing 88. Each movable block 87 also includes a hole 87c at a position offset radially from its axis of rotation, the hole 87c receiving via a multiplicity of rollers 96 a pin 95 whose tip is fitted in the groove 86a of the offset ring 86. Furthermore, a ring holder 97 is attached to the end surface of the block housing 88 for retaining the movable blocks 87. A slider 98 having a hole 98a is slidably received in the groove 87a of each of the movable blocks 87.

A cylindrical ratchet cylinder 99 confronts the block housing 88 and is rotatably supported on the input shaft 63 by way of a pair of ball bearing 100, a pair of spacer rings 101 and a one way clutch 102. Accommodated within the ratchet cylinder 99 are a total of four circumferentially arranged variable rings 103 which are rotatably supported via a multiplicity of rollers 104 by the ratchet cylinder 99. The variable rings 103 are arranged concentrically with one another by way of washers 41 and each include integrally at its circumferential portion a rod 103a extending toward the block housing 88 and a hole 103b facing the inner peripheral surface of the ratchet cylinder 99. It is to be appreciated in this case that ringed portions of the variable rings 103 are staggered so that their respective rods 103a and holes 103b are axially coincident with one another. The variable rings 103 are correspondingly associated with the movable blocks 87, with the rods 103a of the variable rings 103 being rotatably fitted in the holes 98a of the sliders 98 received in the grooves 87a of the movable blocks 87. A ratchet hook 106 is rotatably supported via a shaft 107 within the hole 103 of each variable ring 103 and is urged by a spring 106a so that its ratchet protrudes toward the inner peripheral surface of the ratchet cylinder 99. More specifically, the inner peripheral surface of the ratchet cylinder 99 is provided with internal teeth 99a intended to engage with the ratchet hooks 106. Arrangement is such that the ratchet hooks 106 are unidirectionally permitted to lock into the internal teeth 99a. A silicone rubber 108 is disposed in abutment against the ratchet hook 106 within each hole 103b so that the silicone rubber 108 absorbs shocks which the internal teeth 99a will impart to the ratchet hooks 106. The variable rings 103 are in contact with the inner peripheral surface of the ratchet cylinder 99 through a multiplicity of balls 109, each variable ring 103 being retained by a ring holder 110 fitted on the end surface of the ratchet cylinder 99.

The gear 72a of the gear shaft 72 meshes with a total of four planetary gears 111 which are each provided with a large diameter gear 111a and a small diameter gear 111b. That is, the large diameter gear 111a of each of the planetary gears 111 meshes with the gear 72a of the gear shaft 72, whilst the small diameter gear 111b of each planetary gear 111 meshes internally with the internal gear 69 of the input shaft 63. The planetary gears 111 are rotatably mounted on a planetary carrier 116 by way of a multiplicity of rollers 112, a shaft 113, a washer 114 and a ring holder 115, with the planetary carrier 116 being secured firmly to the ratchet cylinder 99 by means of bolts 117. In addition, a ball bearing 118 intervenes between the planetary carrier 116 and the transmission case 60, with a roller bearing 119 interposed between the gear disk 69a and the ratchet cylinder 99.

This embodiment has substantially the same configuration as the first embodiment except that the rods 103a of the variable rings 103 reciprocate along the groove 87a of the movable block 87 with the aid of the sliders 98 and that the one-way clutch 102 is provided between the input shaft 63 and the ratchet cylinder 99 so as to allow the input side rotational resistance to act on the output side. The same applies to the principles and operations thereof.

Figure 23:
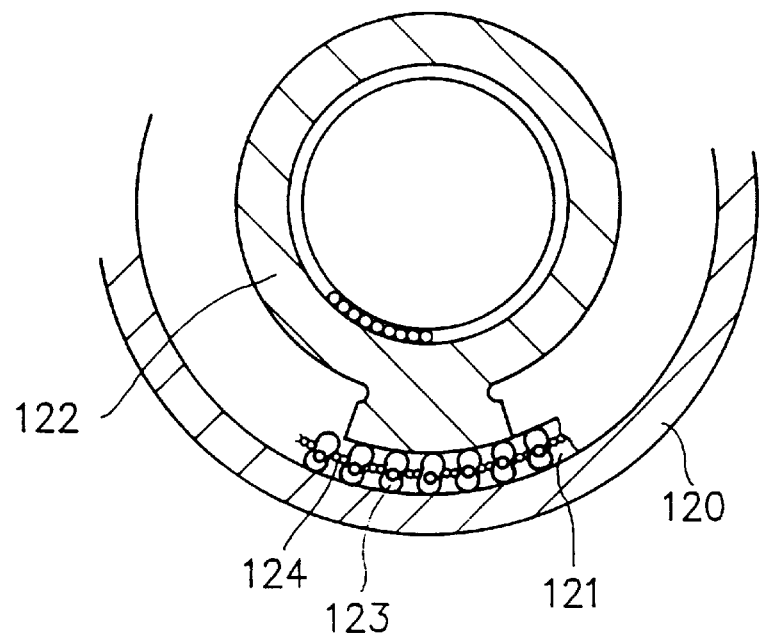
FIG. 23 is a fragmentary cross-sectional front view of another variable speed change gear showing a variant of the second embodiment.
Figure 24:
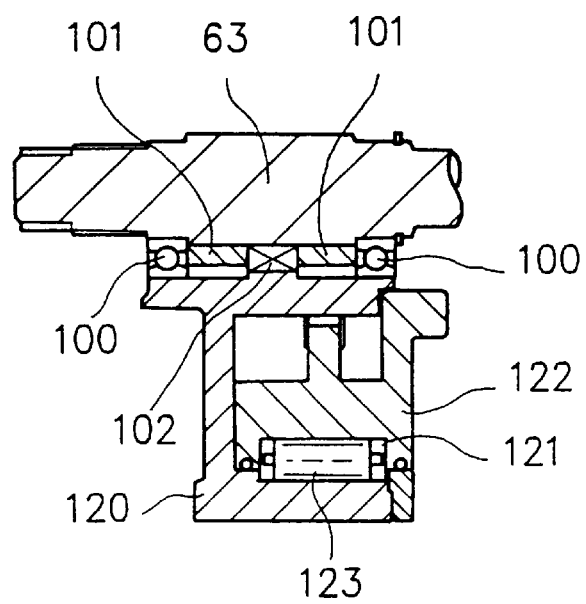
FIG. 24 is a fragmentary cross-sectional side view of the variable speed change gear.
Figure 25:
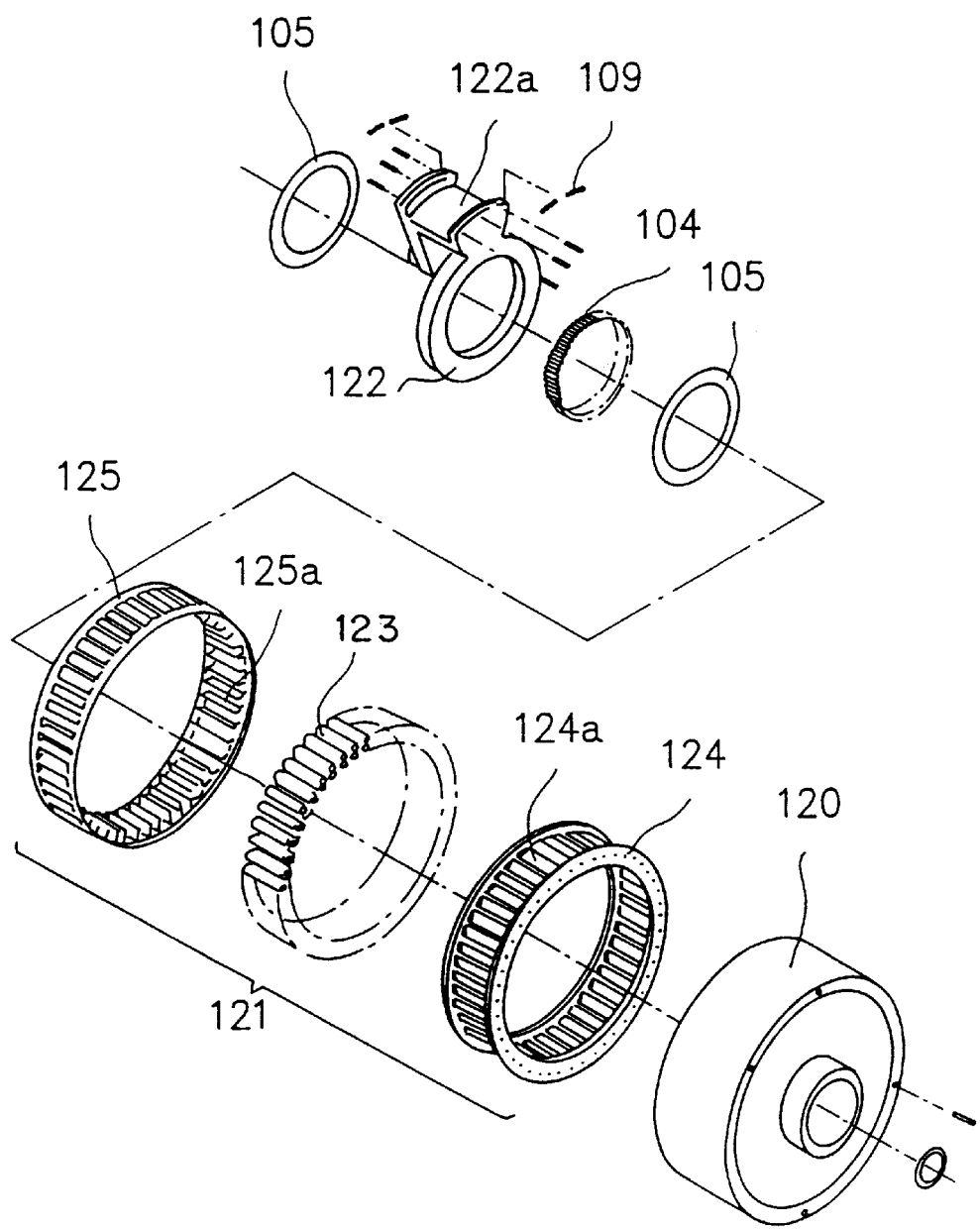
FIG. 25 is a fragmentary exploded perspective view of the variable speed change gear.

FIGS. 23 to 25 illustrate a variant of the second embodiment: FIG. 23 is a fragmentary front sectional view of the variable speed change gear; FIG. 24 is a fragmentary cross-sectional side view thereof; and FIG. 25 is an exploded perspective view of the major part thereof. This embodiment employs a one-way clutch in place of the rachet structure used as the means for transmission from the variable rings 103 to the output side in the above embodiment. It is to be noted that the same constituent elements as the above embodiment are designated by the same reference numerals and are not illustrated except for constitutional differences.

In this configuration, a one-way clutch 121 is disposed within a clutch cylinder 120 corresponding to the ratchet cylinder 99 with a variable ring 122 positioned inside the one-way clutch 121. The one-way clutch 121 comprises a multiplicity of sprags 123 an annular sprag holder 124 for holding the sprags 123, and a ring spring 125 for unidirectionally biasing the sprags 123. The sprag holder 124 has a multiplicity of circumferentially arranged apertures 124a, with the sprags 123 being rotatably positioned within the associated apertures 124a in a spaced apart relationship The ring spring 125 is fitted on the outer periphery of the sprag holder 124 and includes a multiplicity of spring pieces 125a formed on its peripheral surface for urging the sprags 123 in one direction. On the other hand, the variable ring 122 has a curved surface 122a confronting the inner peripheral surface of the clutch cylinder 120, with the sprags 123 of the one-way clutch 121 coming into contact with the curved surface 122a.

INDUSTRIAL APPLICABILITY

According to the variable speed change gear of the present invention, as set forth hereinbefore, power transmission is achieved by a mechanical mesh, ensuring more effective transmission of power and far less element-to-element sliding and wears, as compared with the conventional combination of the belt and pulley. Also, the concentric arrangement of the input shaft and the output shaft will accomplish a miniaturization of the variable speed gear body.

What is claimed is:

1. A variable speed change gear comprising:

an input side rotator rotationally driven by an external driving force;

an output side rotator arranged concentrically with said input side rotator;

a main driving rotator turning on the axis of rotation of said input side rotator under the action of a rotational force of said input side rotator;

a plurality of variable rings arranged on a predetermined circumference around the axis of rotation of said input side rotator, said variable rings revolving along said circumference under the action of a rotational force of said main driving rotator;

angular velocity varying means for periodically varying angular velocities of said variable rings relative to the angular velocity of said main driving rotator;

angular velocity correcting means for correcting periodically varying angular velocities of said variable rings to be substantially uniform within a predetermined phase range; and rotational force extracting means for extracting from said variable rings only rotational forces having corrected angular velocities for transmission to said output side rotator.

2. A variable speed change gear according to claim 1, wherein said angular velocity varying means includes offset means for radially offsetting the axis of revolution of said main driving rotator, and transmission means for transmitting a rotational force of said driving rotator to said variable rings while permitting the radial displacement of the axis of rotation by the offset.

3. A variable speed change gear according to claim 1, wherein said angular velocity correcting means includes a rocker rocking in synchronism with variations in angular velocity, and guide means for rocking said rocker by guiding said rocker along a predetermined path.

4. A variable speed change gear according to claim 1, wherein said rotational force extracting means are comprised of a one-way transmission means for transmitting to said output side rotator a rotational force having the highest angular velocity among rotational forces derived from said variable rings.

5. A variable speed change gear according to claim 4, wherein said one-way transmission means are comprised of a transmission member provided on each of said variable rings in a freely rocking manner, said transmission member serving to lock into a predetermined lock surface of said variable rings output side rotator, when the speed of revolution of said variable rings is higher than that of said output side rotator, to thereby perform a transmission of the rotational force, said transmission member serving to slide over said lock surface of said output side rotator, when the speed of revolution of variable rings is lower than that of said output side rotator, to thereby permit the difference in speed of revolution between the variable rings and said output side rotator.

6. Variable speed change gear comprising:

an input side rotator having an axis of rotation and arranged to be rotationally driven by an external driving force;

an output side rotator arranged concentrically with said input side rotator;

a main driving rotator arranged to turn on the axis of rotation of said input side rotator under the action of a rotational force of said input side rotator;

a control shaft arranged to be driven by the external driving force;

a worm wheel arranged to be driven by said input side rotator;

an offset housing coupled to said worm gear, said worm wheel rotatable in accordance with the amount of rotation of said control shaft thereby causing said offset housing to be radially offset relative to said input side rotator;

a plurality of movable blocks movable with said offset housing, each including a radially extending groove;

a plurality of variable rings arranged on a predetermined circumference around the axis of rotation of said input side rotator, said driven rotators revolvable along said circumference under the action of a rotational force of said input side rotator, each of said variable rings having a rod engaged with a corresponding groove in one of said movable blocks, said rods being radially offset relative to grooves when said offset housing is moved to a radially offset position;

an offset ring including an elliptical groove formed in the surface thereof, said movable blocks including pins for engaging in said elliptical groove, said movable blocks and said offset ring being arranged for correcting periodically varying angular velocities of said variable rings and for making the angular velocities of said variable rings substantially uniform within a predetermined phase range;

a clutch cylinder having an inner peripheral surface positioned radially outwardly from a transmission member provided on each of said variable rings in a freely rocking manner, each of said transmission members serving to lock into an inner peripheral surface of said clutch cylinder of said output side rotator when the speed of revolution of said variable rings is higher than that of said output side rotator, said transmission member being slidable over said inner peripheral surface of said clutch cylinder when the speed of revolution of said variable rings is lower than that of said output side rotator to thereby permit the difference in speed of revolution between the variable rings and said output side rotator, said clutch cylinder being arranged for extracting from said variable rings only rotational forces having corrected angular velocities for transmission to said output side rotator.

7. The variable speed change gear of claim 6, further comprising a transmission case having a first opening for a portion of said input side rotator and a second opening for receiving a portion of said output side rotator, said transmission case being offset to center said portion of said input side rotator.

8. The variable speed change gear of claim 6, wherein said worm wheel is offset relative to an input shaft.

9. The variable speed change gear of claim 6, further comprising a gear disk, an offset ring and four rockers all within said offset housing.

10. The variable speed change gear of claim 6, wherein said input side rotator includes an input shaft and a block housing and said output side rotator includes an output shaft and a clutch cylinder.

\* \* \* \* \*